US012798050B2

(12) United States Patent
Eckel et al.

(10) Patent No.: US 12,798,050 B2
(45) Date of Patent: Nov. 17, 2026

(54) SHAPED ABRASIVE PARTICLES

(71) Applicant: 3M INNOVATIVE PROPERTIES COMPANY, St. Paul, MN (US)

(72) Inventors: Joseph B. Eckel, Vadnais Heights, MN (US); Thomas J. Nelson, Woodbury, MN (US); Fay T. Salmon, Eden Prairie, MN (US); David T. Buckley, Falcon Heights, MN (US); Dominic J. Triana, Minneapolis, MN (US); Alireza Ghaderi, Woodbury, MN (US); Aaron K. Nienaber, Lake Elmo, MN (US); Ronald D. Jesme, Plymouth, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 643 days.

(21) Appl. No.: 17/996,723

(22) PCT Filed: Apr. 15, 2021

(86) PCT No.: PCT/IB2021/053105
§ 371 (c)(1),
(2) Date: Oct. 20, 2022

(87) PCT Pub. No.: WO2021/214605
PCT Pub. Date: Oct. 28, 2021

(65) Prior Publication Data

US 2023/0211470 A1 Jul. 6, 2023

Related U.S. Application Data

(60) Provisional application No. 63/014,357, filed on Apr. 23, 2020.

(51) Int. Cl.
*B24D 18/00* (2006.01)
*B24D 3/00* (2006.01)
(Continued)

(52) U.S. Cl.
CPC .......... *B24D 18/0009* (2013.01); *B24D 3/00* (2013.01); *B24D 11/001* (2013.01);
(Continued)

(58) Field of Classification Search
CPC .... B24D 18/0009; B24D 3/00; B24D 11/001; B24D 18/0072; B24D 11/00;
(Continued)

(56) References Cited

U.S. PATENT DOCUMENTS 1,477,767 A 12/1923 Pulis
2,370,636 A 3/1945 Carlton
(Continued)

FOREIGN PATENT DOCUMENTS

DE 102017210799 A1 * 12/2018 .......... C09K 3/1409
WO 2011068714 A2 6/2011
(Continued)

OTHER PUBLICATIONS

International Search Report for PCT International Application No. PCT/IB2021/053105, mailed on Jul. 15, 2021, 5 pages.
(Continued)

*Primary Examiner* — Anthony J Green
*Assistant Examiner* — Anastasia A. Kuvayskaya

(57) ABSTRACT

A mold for making abrasive particles is presented. The mold includes a surface and a plurality of cavities extending downward from the surface. Each cavity includes a particle shape portion comprising a polygonal shape and a fracture portion coupled to the particle shape portion. The fracture portion is configured to break from the particle shape portion during a stress event, resulting in a fractured shape abrasive particle.

9 Claims, 21 Drawing Sheets

(51) Int. Cl.
*B24D 11/00* (2006.01)
*C09K 3/14* (2006.01)

(52) U.S. Cl.
CPC ........ *B24D 18/0072* (2013.01); *C09K 3/1418* (2013.01); *C09K 3/1436* (2013.01)

(58) Field of Classification Search
CPC .. C09K 3/1418; C09K 3/1436; C09K 3/1409; C09K 3/1427
See application file for complete search history.

(56) References Cited

U.S. PATENT DOCUMENTS

| | | | | |
|---|---|---|---|---|
| 2,857,879 | A | 10/1958 | Johnson | |
| 3,625,666 | A | 12/1971 | James | |
| 4,008,055 | A | 2/1977 | Phaal | |
| 4,314,827 | A | 2/1982 | Leitheiser et al. | |
| 4,623,364 | A | 11/1986 | Cottringer et al. | |
| 4,744,802 | A | 5/1988 | Schwabel | |
| 4,770,671 | A | 9/1988 | Monroe et al. | |
| 4,881,951 | A | 11/1989 | Wood et al. | |
| 5,152,917 | A | 10/1992 | Pieper et al. | |
| 5,181,939 | A | 1/1993 | Neff | |
| 5,213,591 | A | 5/1993 | Celikkaya et al. | |
| 5,435,816 | A | 7/1995 | Spurgeon et al. | |
| 5,672,097 | A | 9/1997 | Hoopman | |
| 5,946,991 | A | 9/1999 | Hoopman | |
| 5,975,987 | A | 11/1999 | Hoopman et al. | |
| 6,129,540 | A | 10/2000 | Hoopman et al. | |
| 8,262,758 | B2 | 9/2012 | Gao | |
| 2009/0165394 | A1 | 7/2009 | Culler et al. | |
| 2009/0169816 | A1 * | 7/2009 | Erickson | B24D 3/00 428/142 |
| 2010/0146867 | A1 | 6/2010 | Boden et al. | |
| 2010/0151195 | A1 | 6/2010 | Culler et al. | |
| 2010/0151196 | A1 | 6/2010 | Adefris et al. | |
| 2010/0151201 | A1 | 6/2010 | Erickson et al. | |
| 2010/0319269 | A1 | 12/2010 | Erickson | |
| 2013/0344786 | A1 | 12/2013 | Keipert et al. | |
| 2015/0267098 | A1 | 9/2015 | Welygan et al. | |
| 2016/0144480 | A1 * | 5/2016 | Eugster | B24D 5/00 51/307 |
| 2016/0186028 | A1 * | 6/2016 | Louapre | C09K 3/1409 51/309 |
| 2020/0181469 | A1 * | 6/2020 | Misak | C04B 35/00 |

FOREIGN PATENT DOCUMENTS

| | | | |
|---|---|---|---|
| WO | 2013177446 | A1 | 11/2013 |
| WO | 2018080703 | A1 | 5/2018 |
| WO | 2018080704 | A1 | 5/2018 |
| WO | 2018080705 | A1 | 5/2018 |
| WO | 2018080755 | A1 | 5/2018 |
| WO | 2018080756 | A1 | 5/2018 |
| WO | 2018080765 | A1 | 5/2018 |
| WO | 2018080784 | A1 | 5/2018 |
| WO | 2018080799 | A1 | 5/2018 |
| WO | 2018134732 | A1 | 7/2018 |
| WO | 2018136268 | A1 | 7/2018 |
| WO | 2018136269 | A1 | 7/2018 |
| WO | 2018136271 | A1 | 7/2018 |
| WO | 2019207415 | A1 | 10/2019 |
| WO | 2019207416 | A1 | 10/2019 |
| WO | 2019207417 | A1 | 10/2019 |
| WO | 2020089741 | A1 | 5/2020 |
| WO | 2021009600 | A1 | 1/2021 |
| WO | 2021014271 | A1 | 1/2021 |
| WO | 2021074768 | A1 | 4/2021 |
| WO | 2021079331 | A1 | 4/2021 |

OTHER PUBLICATIONS

Wikkawikki, “Finite Element Method Magnetics: Magnetics, Electrostatics, Heat Flow, and Current Flow”, Available Online at URL: <http://web.archive.org/web/20221006051646/https://www.femm.info/wiki/HomePage>, Oct. 2022, 1 page.

* cited by examiner

SHAPED ABRASIVE PARTICLES

CROSS REFERENCE TO RELATED APPLICATIONS

This application is a national stage filing under 35 U.S.C. 371 of PCT/IB2021/053105, filed Apr. 15, 2021, which claims the benefit of U.S. Provisional Application No. 63/014,357, filed Apr. 23, 2020, the disclosure of which is incorporated by reference in its/their entirety herein.

BACKGROUND

Abrasive particles and abrasive articles including abrasive particles are useful for abrading, finishing, or grinding a wide variety of materials and surfaces in the manufacturing of goods. As such, there continues to be a need for improving the cost, performance, or life of abrasive particles or abrasive articles.

SUMMARY

A mold for making abrasive particles is presented. The mold includes a surface and a plurality of cavities extending downward from the surface. Each cavity includes a particle shape portion comprising a polygonal shape and a fracture portion coupled to the particle shape portion. The fracture portion is configured to break from the particle shape portion during a stress event, resulting in a fractured shape abrasive particle.

BRIEF DESCRIPTION OF THE FIGURES

The drawings illustrate generally, by way of example, but not by way of limitation, various embodiments discussed in the present document.

DETAILED DESCRIPTION

Figure 1:
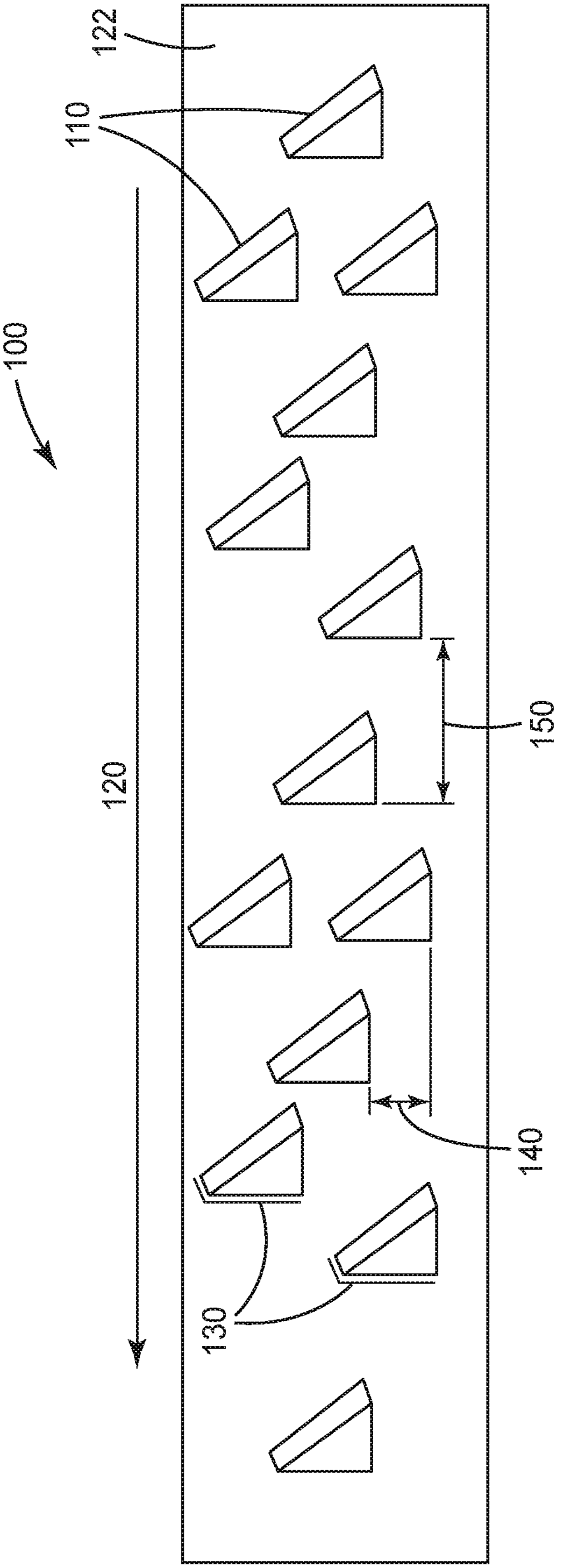
FIG. 1 is an abrasive article in which embodiments of the present invention may be useful.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

As used herein, the term "shaped abrasive particle," means an abrasive particle with at least a portion of the abrasive particle having a predetermined shape that is replicated from a mold cavity used to form the shaped precursor abrasive particle. Except in the case of abrasive shards (e.g. as described in US Patent Application Publication Nos. 2009/0169816 and 2009/0165394), the shaped abrasive particle will generally have a predetermined geometric shape that substantially replicates the mold cavity that was used to form the shaped abrasive particle. Shaped abrasive particle as used herein excludes abrasive particles obtained by a mechanical crushing operation. Suitable examples for geometric shapes having at least one vertex include polygons (including equilateral, equiangular, star-shaped, regular and irregular polygons), lens-shapes, lune-shapes, circular shapes, semicircular shapes, oval shapes, circular sectors, circular segments, drop-shapes and hypocycloids (for example super elliptical shapes).

The term "ferrimagnetic" refers to materials that exhibit ferrimagnetism. Ferrimagnetism is a type of permanent magnetism that occurs in solids in which the magnetic fields associated with individual atoms spontaneously align themselves, some parallel, or in the same direction (as in ferromagnetism), and others generally antiparallel, or paired off in opposite directions (as in antiferromagnetism). The magnetic behavior of single crystals of ferrimagnetic materials may be attributed to the parallel alignment; the diluting effect of those atoms in the antiparallel arrangement keeps the magnetic strength of these materials generally less than that of purely ferromagnetic solids such as metallic iron. Ferrimagnetism occurs chiefly in magnetic oxides known as ferrites. The spontaneous alignment that produces ferrimagnetism is entirely disrupted above a temperature called the Curie point, characteristic of each ferrimagnetic material. When the temperature of the material is brought below the Curie point, ferrimagnetism revives.

The term "ferromagnetic" refers to materials that exhibit ferromagnetism. Ferromagnetism is a physical phenomenon in which certain electrically uncharged materials strongly attract others. In contrast to other substances, ferromagnetic materials are magnetized easily, and in strong magnetic fields the magnetization approaches a definite limit called saturation. When a field is applied and then removed, the magnetization does not return to its original value. This phenomenon is referred to as hysteresis. When heated to a certain temperature called the Curie point, which is generally different for each substance, ferromagnetic materials lose their characteristic properties and cease to be magnetic; however, they become ferromagnetic again on cooling.

The terms "magnetic" and "magnetized" mean being ferromagnetic or ferrimagnetic at 20° C., or capable of being made so, unless otherwise specified. Preferably, magnetizable layers according to the present disclosure either have, or can be made to have by exposure to an applied magnetic field.

The term "magnetic field" refers to magnetic fields that are not generated by any astronomical body or bodies (e.g., Earth or the sun). In general, magnetic fields used in practice of the present disclosure have a field strength in the region of the magnetizable abrasive particles being oriented of at least about 10 gauss (1 mT), preferably at least about 100 gauss (10 mT), and more preferably at least about 1000 gauss (0.1 T).

The term "magnetizable" means capable of being magnetized or already in a magnetized state.

For the purposes of this invention, geometric shapes are also intended to include regular or irregular polygons or stars wherein one or more edges (parts of the perimeter of the face) can be arcuate (either of towards the inside or towards the outside, with the first alternative being preferred). Hence, for the purposes of this invention, triangular shapes also include three-sided polygons wherein one or more of the edges (parts of the perimeter of the face) can be arcuate. The second side may comprise (and preferably is) a second face. The second face may have a perimeter of a second geometric shape.

For the purposes of this invention, shaped abrasive particles also include abrasive particles comprising faces with different shapes, for example on different faces of the abrasive particle. Some embodiments include shaped abrasive particles with different shaped opposing sides. The different shapes may include, for example, differences in surface area of two opposing sides, or different polygonal shapes of two opposing sides.

The shaped abrasive particles are typically selected to have an edge length in a range of from 0.001 mm to 26 mm, more typically 0.1 mm to 10 mm, and more typically 0.5 mm to 5 mm, although other lengths may also be used.

The shaped abrasive particle may have a "sharp portion" which is used herein to describe either a sharp tip or a sharp edge of an abrasive article. The sharp portion may be defined using a radius of curvature, which is understood in this disclosure, for a sharp point, to be the radius of a circular arc which best approximates the curve at that point. For a sharp edge, the radius of curvature is understood to be the radius of the curvature of the profile of the edge on the plane perpendicular to the tangent direction of the edge. Further, the radius of curvature is the radius of a circle which best fits a normal section, or an average of sections measured, along the length of the sharp edge. The smaller a radius of curvature, the sharper the sharp portion of the abrasive particle. Shaped abrasive particles with sharp portions are defined in U.S. Provisional Patent Application Ser. No. 62/877,443, filed on Jul. 23, 2019, which is hereby incorporated by reference.

FIG. 1 is an abrasive article in which embodiments of the present invention may be useful. A coated abrasive article 100, in one embodiment, includes a plurality of shaped abrasive particles 110 adhered to a backing 122. A cutting direction of abrasive particle 110 is illustrated by arrow 120. Abrasive particles are arranged on backing 102 such that a cutting face 130 of each abrasive article is exposed to abrade a surface. As illustrated by parallel lines 150, in some embodiments, at least a majority of cutting faces 130 are aligned in parallel with each other. In some embodiments, at least about 50%, or at least about 60%, or at least about 70%, or at least about 80%, or at least about 90%, or at least about 95%, or substantially all of cutting faces 130 are aligned with respect to each other. Additionally, at least a majority of abrasive particle bases of abrasive particles are also aligned with respect to each other, as indicated by reference numeral 140. In one embodiment, abrasive particle bases are aligned perpendicularly to a web direction, as indicated by parallel lines 150. In some embodiments, at least about 50%, or at least about 60%, or at least about 70%, or at least about 80%, or at least about 90%, or at least about 95%, or substantially all of bases are aligned with respect to each other.

Orientation of abrasive particles is particularly important for the efficacy of an abrasive article. For example, a shaped abrasive particle may have a sharp tip or a sharp edge that should be oriented away from a backing material. Sharp edges, as discussed in greater detail below, may have a preferred abrading orientation and may have different abrading properties depending on whether a cutting surface is leading or trailing during an abrading operation. Orientation of the abrasive particles in coated abrasive articles generally has an influence on abrading properties. In the instance that the abrasive particles are precisely-shaped (e.g., into triangular platelets or conical particles), this effect of orientation can be especially important as discussed in U. S. Pat. Appl. Publ. No. 2013/0344786 A1 (Keipert), incorporated by reference herein.

The orientation and alignment of particles 110 is beneficial for several reasons. Particles described herein may have a sharp cutting edge along a cutting face. Orienting such particles so that the cutting face is perpendicular to a web direction allows for sustained and higher cut rates of abrasive articles. Specifically, a 90° orientation with respect to a web direction can help reduce wear flat by enabling subsequent fracturing of a shaped abrasive particle more easily after they have already fractured.

A solution is needed that can align shaped particles substantially perpendicular to the web direction while orienting a sharp edge or tip of the abrasive particle away from the backing, as illustrated in FIG. 1. The solution should also be able to orient precision shaped abrasive particles with a forward to backward tilt to achieve a desired rake angle. Rake angles are described in greater detail in co-owned provisional patent application with Ser. No. 62/754,225 filed on Nov. 1, 2018, incorporated by reference herein. In some embodiments, the shaped particles are shaped such that all, or substantially all, orient with a cutting edge in the same direction. Shaped abrasive particles described herein have improved orientation control, allowing for more particles to be in a desired orientation, and oriented with respect to each other.

In addition to providing orientation benefits, in some embodiments, particles designed herein include portions that are designed to fracture off during manufacture or during a first abrasive operation. Complete fracturing can result in a sharper tip or edge than is achievable by molding alone due to the limitations of mold design and release agent usage. In addition, a sharp edge or tip created from a fracture during the manufacturing process can reduce or eliminate the need for high precision in making of the master tool, thereby increasing speed of manufacture, tool making options, and reducing costs.

Figure 2A:
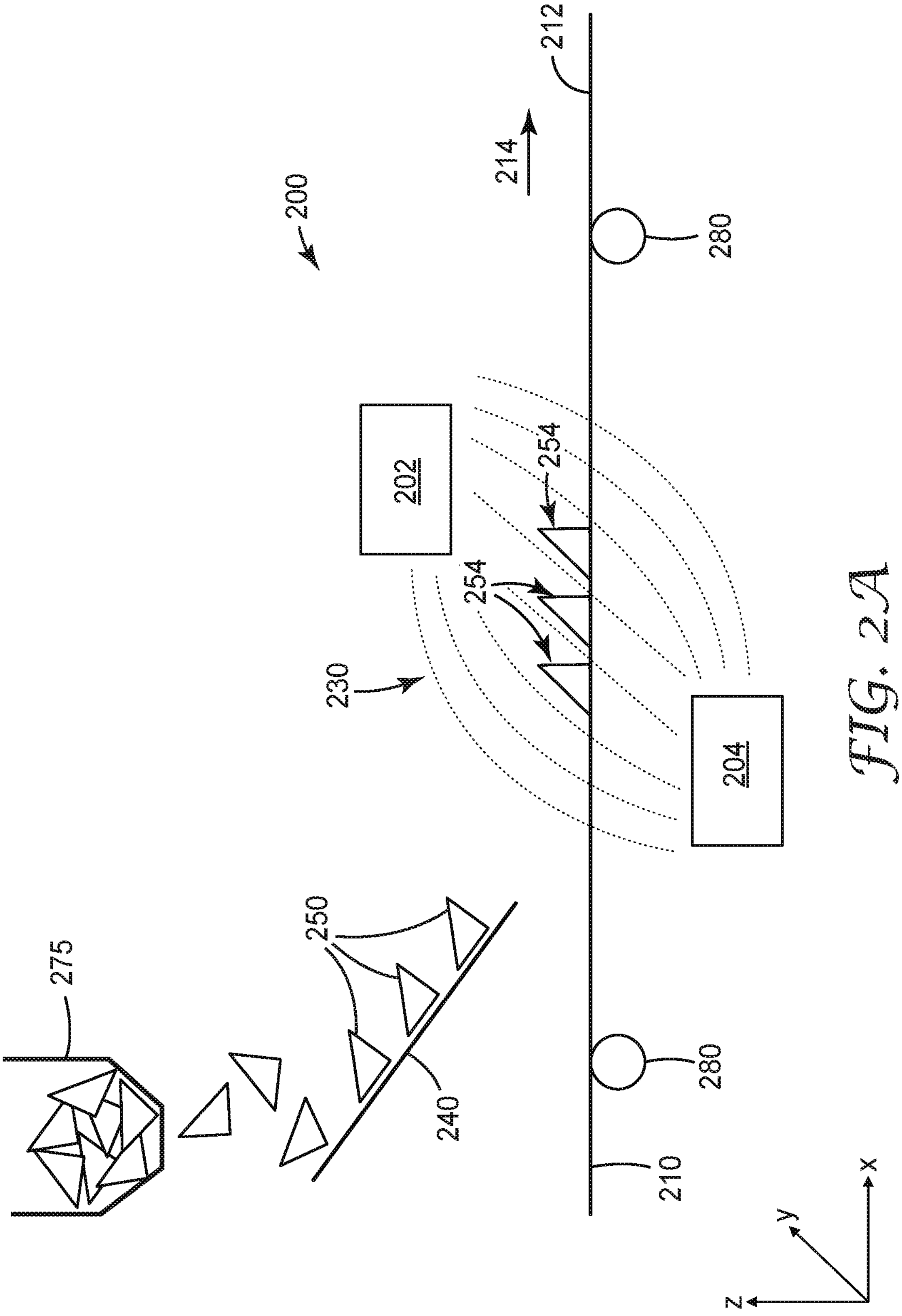
FIGS. 2A and 2B are illustrative schematics for aligning shaped abrasive particles on a coated abrasive article in accordance with an embodiment of the present invention.
Figure 2B:
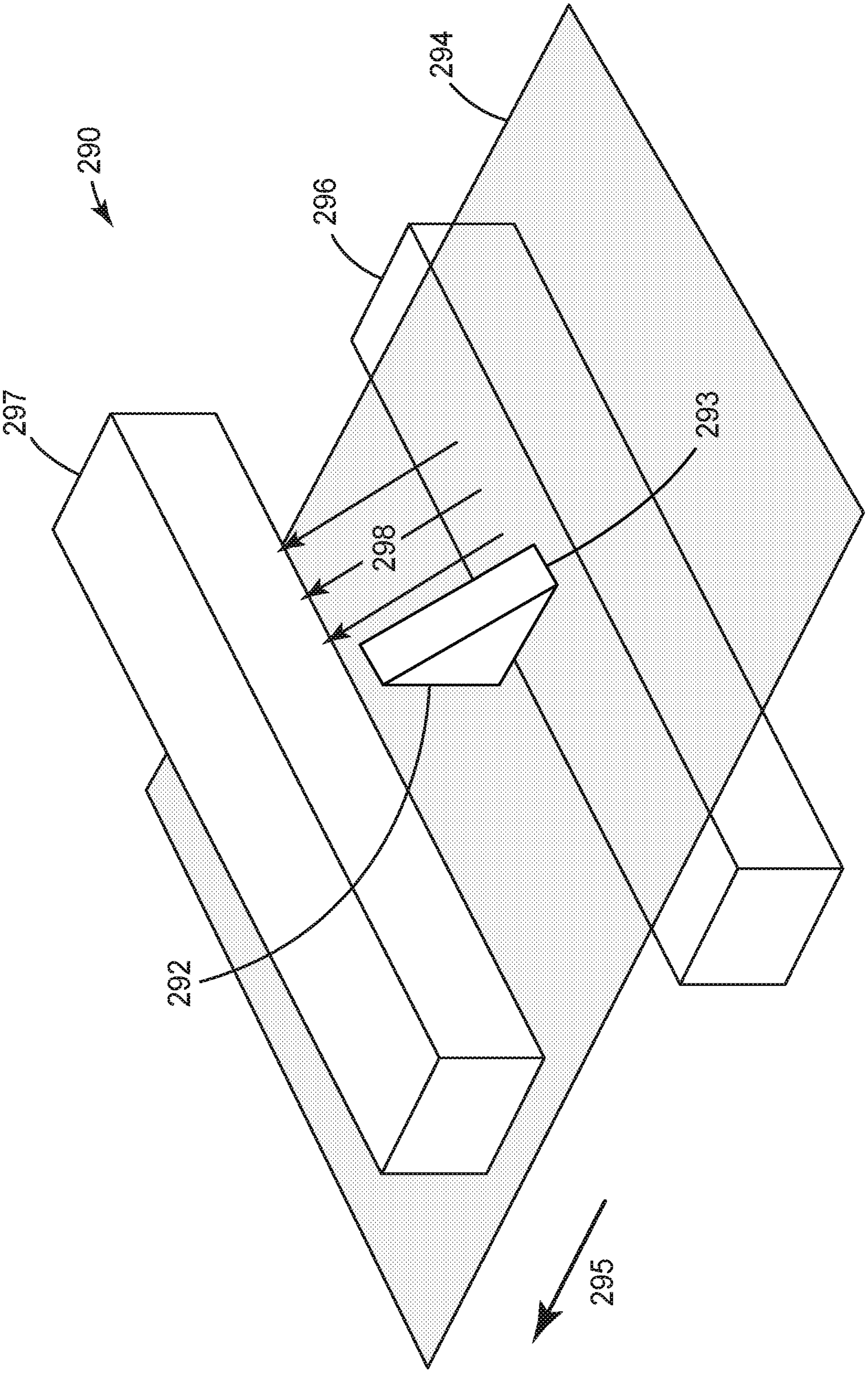

FIGS. 2A and 2B are schematic illustrations for aligning shaped abrasive particles on a coated abrasive article in accordance with an embodiment of the present invention. FIG. 2A illustrates a system 200 for aligning magnetically responsive abrasive particles on a backing using a magnetic field. Preferred orientation of shaped abrasive particles 250 can be achieved using shaped abrasive particles that include at least some magnetic material and exposing them to a magnetic field. Shaped abrasive particles can include magnetic material in their composition, can be coated with a layer of magnetic material or both.

The magnetically responsive shaped abrasive particles can be arranged, or deposited, randomly on backing 210. Shaped abrasive particles 250 can then be exposed to a magnetic field 230 in such a manner that shaped abrasive particles 250 are oriented. Once properly oriented, shaped abrasive particles 250 can be adhered to backing 210 with a resin binder, referred to as a make coat. Optionally, additional layers, such as a size coat, can also be applied. As a result of this process, individual shaped abrasive particles 250 are positioned on backing 210 such that abrasive particles 250 are parallel to each other and have cutting faces facing in a downweb direction 214.

FIG. 2A illustrates a backing 210 receiving abrasive particles 250 from a hopper 275. Backing 210 may have a make layer or make layer precursor (not shown) disposed thereon. Backing 210 moves along web path 212 in a downweb direction 214 (e.g., machine direction). Backing 210 has a crossweb direction (not shown) that is perpendicular to downweb direction 214. Magnetizable particles 250 are dropped through a portion of applied magnetic field 230 onto backing 210. At least some of magnetizable particles 250 are abrasive particles with shapes as described in further detail herein that causes them to experience a net magnetic torque when exposed to magnetic field 230. While triangular prisms are illustrated in FIGS. 2A and 2B as an example, it is expressly contemplated that other shapes described herein may better respond to magnetic field 230, such that they are more easily aligned in the desired directions with respect to the web and each other.

Magnetizable particles 250 are predominantly deposited onto backing 210 after travelling down downward sloping dispensing surface 240, which is fed from a hopper 275. Various web handling components 280 (e.g., rollers, conveyor belts, feed rolls, and take up rolls) handle backing 210.

A shape of magnetizable particles 250 affects how, and whether each particle 250 will align when exposed to magnetic field 230. Some factors that influence the particle orientation during manufacturing are: size of the particle, shape of the particle, strength of the magnetic field, type of magnetic material on the particles, composition of the make coat, linespeed, and other manufacturing processes. As described in greater detail in application 62/924,956, filed on Oct. 23, 2019, incorporated herein by reference, different shapes of magnetizable particles will experience a different magnetic torque when exposed to a magnetic field that may cause them to 'stand up' or 'lie down' on backing 212. In addition to the torque of standing up or lying down, there is also a torque to rotate the particles about the z axis and orient the cutting face. For example, illustrated in FIGS. 2A and 2B are particles 250, 292, that are "standing up" on an edge, such that both the polygonal face and cutting face 254 is perpendicular to the web.

It is desired to have magnetizable particles 250 with shapes that cause them to orient in the Z direction such that cutting face 254 is oriented in a downweb direction 214, and cutting faces 254 of other particles are parallel to each other.

In general, applied magnetic fields used in practice of the present disclosure have a field strength in the region of the magnetizable particles being affected (e.g., attracted and/or oriented) of at least about 10 gauss (1 mT), at least about 100 gauss (10 mT), or at least about 1000 gauss (0.1 T), although this is not a requirement.

Magnetic elements 202 and 204 are positioned such that force of magnetic field 230 is experienced by magnetic particles 250 before particles 250 contact backing too 210. In one embodiment, magnetic particles 250 do not substantially experience magnetic force 230 until after they contact backing 210. In an embodiment where magnetic particles 250 are dispensed without the influence of a magnetic field, the particles 250 have a tendency to land on the largest surface, and in a random orientation. When magnetic field 230 is then applied by magnetic elements 202 and 204, magnetic particles 250 will 'stand up' such that a thickness 293 contacts backing 210, such that cutting face 254 is aligned in a downweb direction, and such that particles 250 are substantially parallel to each other. In one embodiment, magnetic particles 250 contact backing 210 prior to a make coat layer or make coat precursor being applied.

The applied magnetic field can be provided by one or more permanent magnets and/or electromagnet(s), or a combination of magnets and ferromagnetic members, for example. Suitable permanent magnets include rare-earth magnets. The applied magnetic field can be static or variable (e.g., oscillating). The upper and/or lower magnetic elements (202, 204), each having north (N) and south (S) poles, may be monolithic or they may be composed of multiple component magnets and/or magnetizable bodies, for example. If comprised of multiple magnets, the multiple magnets in a given magnetic member can be contiguous and/or co-aligned (e.g., at least substantially parallel) with respect to their magnetic field lines where the component magnets closest approach each other. Magnets 202 and 204 may be retained in place by one or more retainers (not shown). While stainless steel 304 or an equivalent is suitable for retaining magnets 202, 204 in place, due to its low-magnetic character, magnetizable materials may also be used. Mild steel mounts may support the stainless-steel retainers. The application of a magnetic field is not intended to be limited to the illustrated arrangement, however. A magnetic yoke is also envisioned in some embodiments that connects magnets 202 and 204. Additionally, in some embodiments a Halbach array of magnets may be suitable.

The downward sloping dispensing surface 240 may be inclined at any suitable angle, provided that the magnetizable particles can travel down the surface and be dispensed onto the web. Suitable angles may be in a range of from 15 to 60 degrees, although other angles may also be used. In some instances, it may be desirable to vibrate the downward sloping dispensing surface to facilitate particle movement.

The downward sloping dispensing surface may be constructed of any dimensionally stable material, that may be non-magnetizable. Examples include: metals such as aluminum; wood; and plastic.

Once the magnetizable particles are coated on to backing 210, the make layer precursor is at least partially cured at a curing station (not shown), so as to firmly retain the magnetizable particles in position. In some embodiments, additional magnetizable and/or non-magnetizable particles (e.g., filler abrasive particle and/or grinding aid particles) can be applied to the make layer precursor prior to curing.

In the case of a coated abrasive article, the curable binder precursor comprises a make layer precursor, and the magnetizable particles comprise magnetizable abrasive particles. A size layer precursor may be applied over the at least partially cured make layer precursor and the magnetizable abrasive particles, although this is not a requirement. If present, the size layer precursor is then at least partially cured at a second curing station, optionally with further curing of the at least partially cured make layer precursor. In some embodiments, a supersize layer is disposed on the at least partially cured size layer precursor.

FIG. 2B illustrates a schematic of a system 290 for aligning magnetically responsive particles on a backing. FIG. 2B illustrates a simple example of a single particle 292 on a backing 294. Backing 294 moves in a coating direction as indicated by arrow 295. As illustrated, magnetic elements 296, 297 generate a magnetic field 298 that acts on particle 292.

Magnetic elements 296, 297 are positioned on opposite sides of a coating web, and offset with respect to coating web direction 295. In one embodiment, as illustrated in FIG. 2B, a first magnetic element 296 encountered by particle 292 is below backing 294, while a second magnetic element 297 is above backing 294. However, in another embodiment, particle 292 first experiences a magnetic element above the backing, and a second magnetic element below the backing. Other suitable configurations are also possible.

Figure 3:
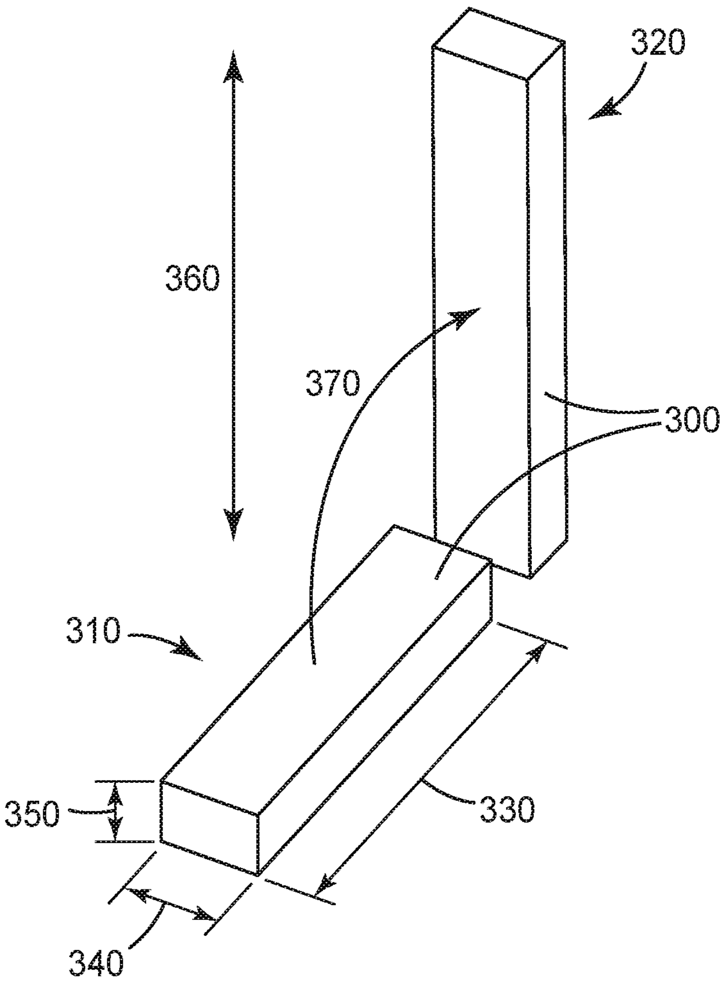
FIG. 3 is a diagram illustrating the effect of a magnetic field on an abrasive particle.

FIG. 3 is a diagram illustrating the effect of a magnetic field on an abrasive particle. Abrasive particle 300 is a magnetically responsive abrasive particle, including a magnetically responsive coating (not shown in FIG. 3), for example. Abrasive particle 300 is illustrated as a rectangular prism for ease of understanding. However, similar principals would apply for abrasive particles of other shapes, such as those described in FIGS. 5 and 7.

Abrasive particle 300 has a length 330, a width 340, and a thickness 350. When dropped onto a backing, abrasive particle 300 has a tendency to land as shown in position 310, with a largest surface area in contact with the backing. However, when a magnetic field 360 is applied, abrasive particle 300 experiences a torque that causes the largest dimension to align with the direction of the magnetic field, into second position 320.

Figure 4:
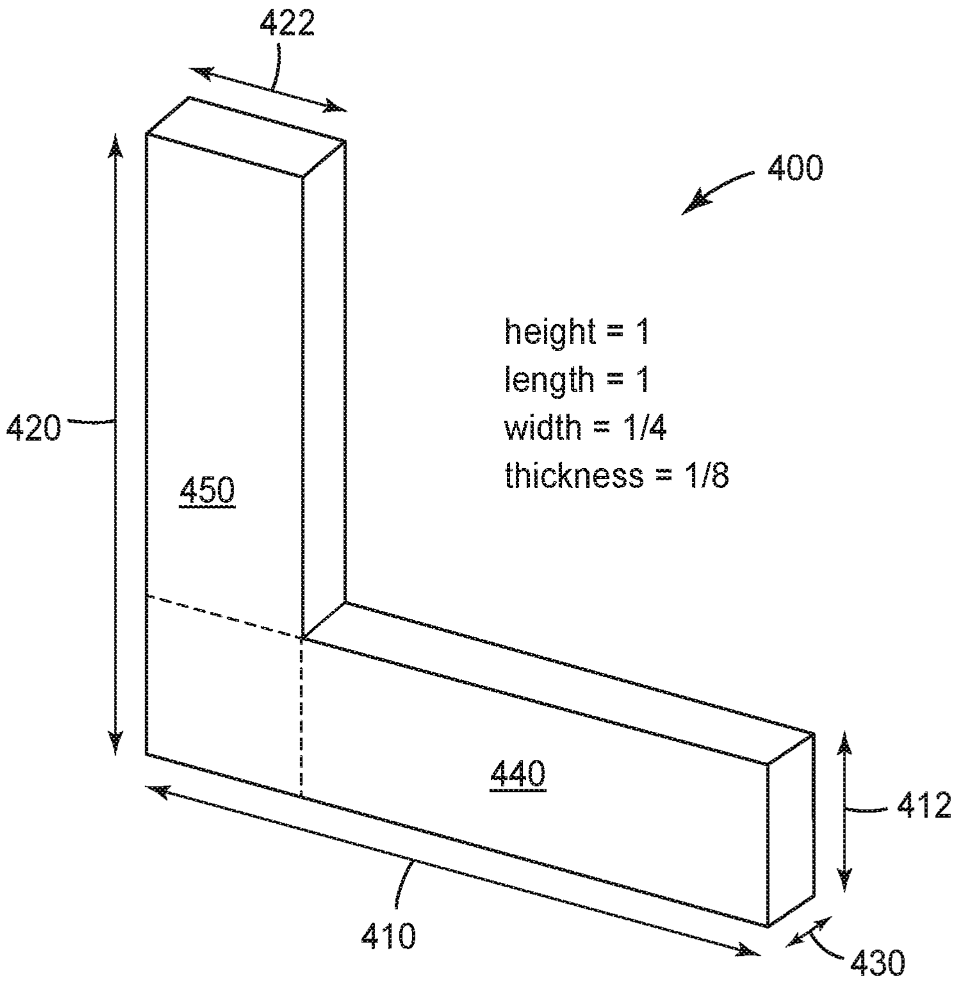
FIG. 4 is a diagrammatic illustration of a hypothetical abrasive particle.

FIG. 4 is a diagrammatic illustration of a hypothetical abrasive particle with an equal height 420 and length 410, each with a width 422, 412, respectively. The entire particle has a thickness 430. As described in application 62/924,956, filed on Oct. 23, 2019 in greater detail, by varying widths 422, 412 and thickness 430, the behavior of particle 400 may change as the experienced net magnetic torque changes. When exposed to a vertical magnetic field this L-shaped particle will experience a net magnetic torque, with magnetic torque contributions from the base and shaft.

FIGS. 1-2 illustrate triangular-shaped abrasive particles that can be used in the construction of abrasive articles such as coated, nonwoven, bonded or other abrasive articles. However, orienting the triangular-shaped abrasive particles such that they ‘stand up’ on a thickness, with cutting faces facing the same direction, can be difficult. However, as understood by FIGS. 3-5, it is possible to alter the experienced magnetic torque on a triangular-shaped particle by adding one or more sacrificial portions to the particle.

Figure 5A:
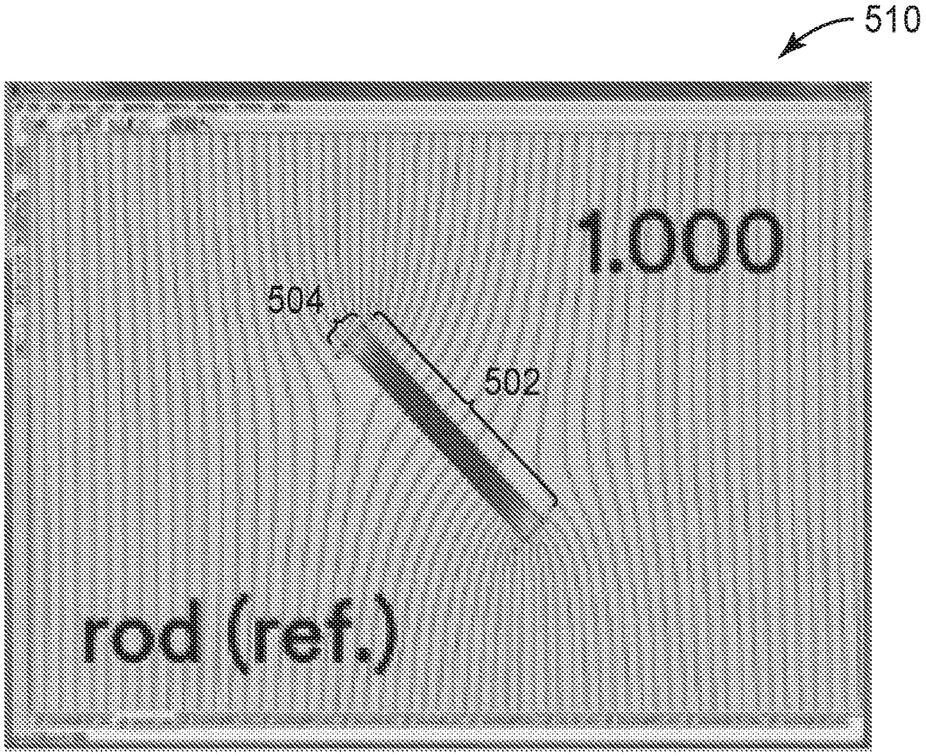
FIGS. 5A-5E illustrate torque diagrams of shaped abrasive particles in accordance with an embodiment of the present invention.
Figure 5B:
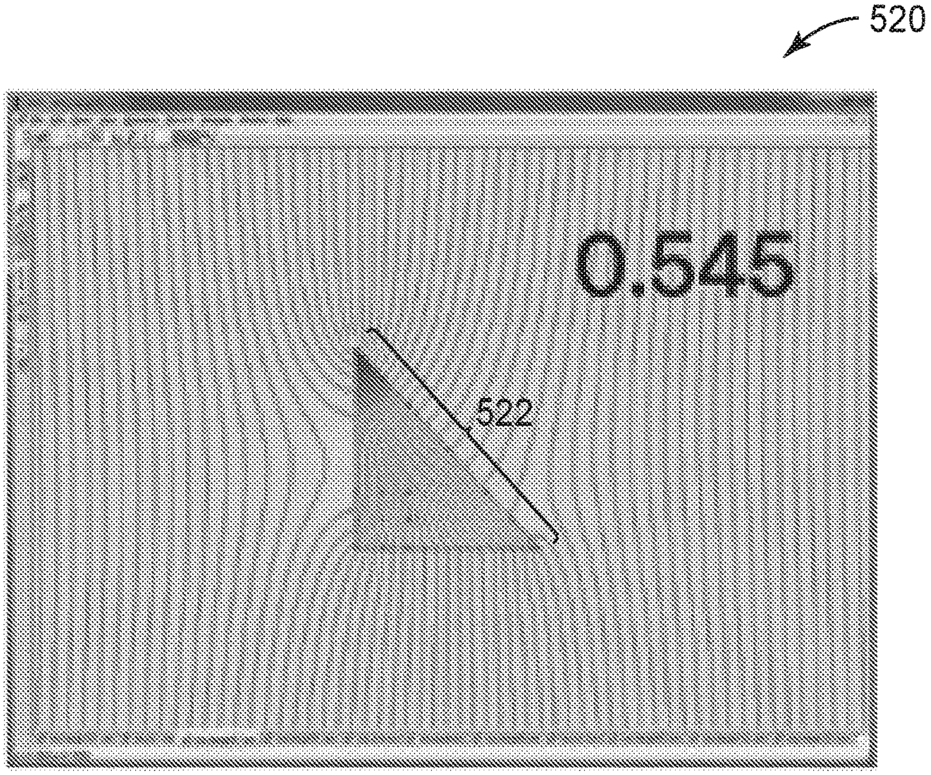

FIGS. 5A-5E illustrate torque diagrams of shaped abrasive particles in accordance with an embodiment of the present invention. The particles of FIGS. 5A-5E are assumed to be responsive to a magnetic field, for example either including magnetically responsive material or a coating of magnetically responsive material. The particles of FIGS. 5A-5E were modeled as a sheet of steel having a % unit length thickness with various profiles, as shown. The particles were positioned in a uniform magnetic field of 0.17 Tesla. Modeling and simulation were accomplished using Finite Element Method Magnetics, Version 4.2, http://www.femm.info. FIG. 5A illustrates a depiction 510 of a rod-shaped particle with a length 502 of 1 unit and a width 504 of 0.1 unit. FIGS. 5B-5E illustrate additional profiles and resultant relative torques, normalized with respect to the rod of FIG. 5A, such that the rod experiences a reference torque normalized to 1.0. The torque analysis of FIG. 5 does not directly address the torque that compels a particle to ‘stand up’ but rather analyzes the torque that is useful to align particles to be parallel to each other and have cutting faces facing in a downweb direction as illustrated in FIGS. 1 and 2. Shapes that produce higher torque can be preferred to enable better alignment especially when the particle is exposed to adhesive or a viscous fluid, and in cases where it may be desirable to use less magnetic material per particle. FIG. 5B illustrates a depiction 520 right-triangle shaped abrasive particle with a hypotenuse having a length 522 of 1 unit. Triangle 522 experiences a relative torque of 0.545.

Figure 5C:
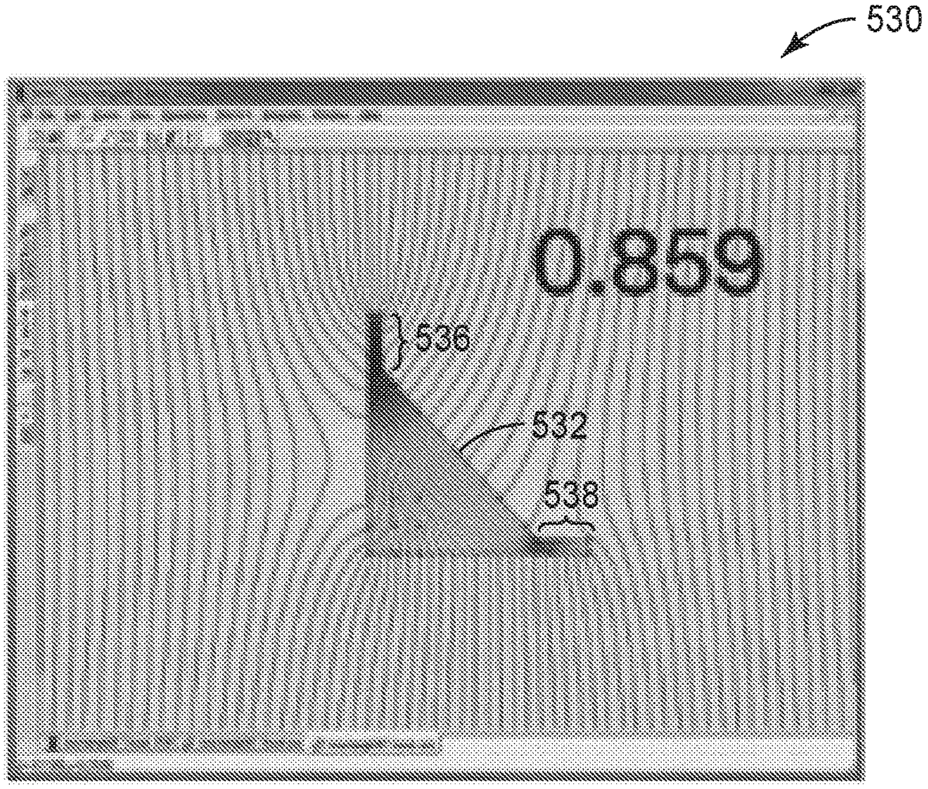
Figure 5D:
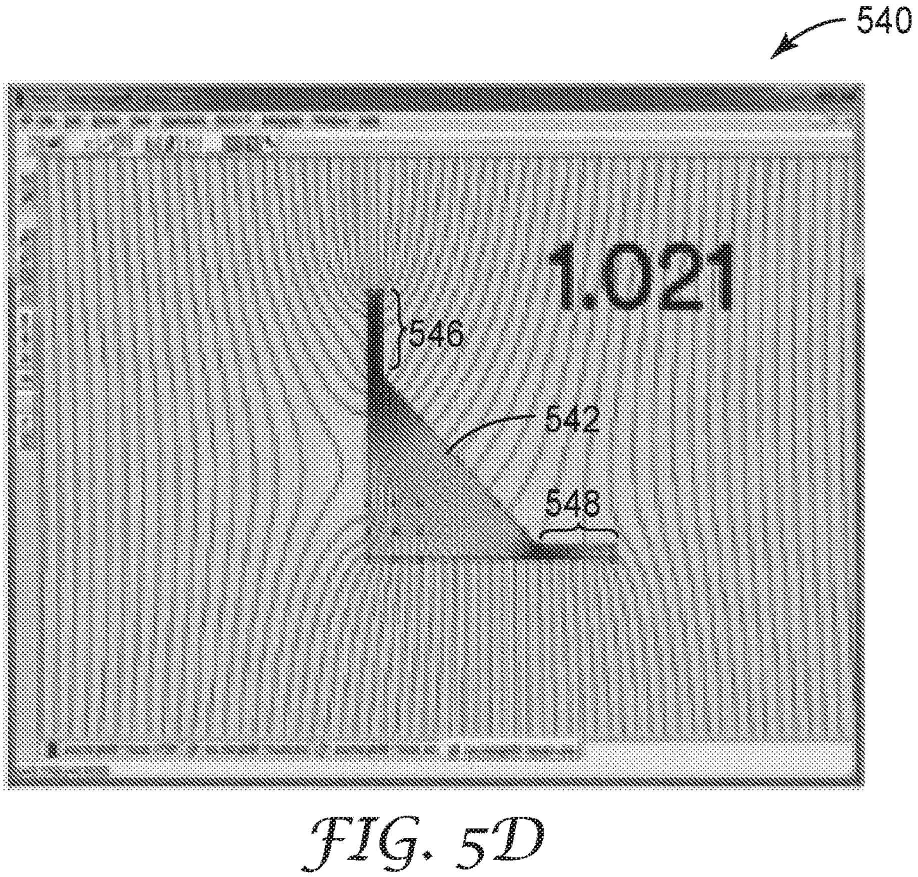
Figure 5E:
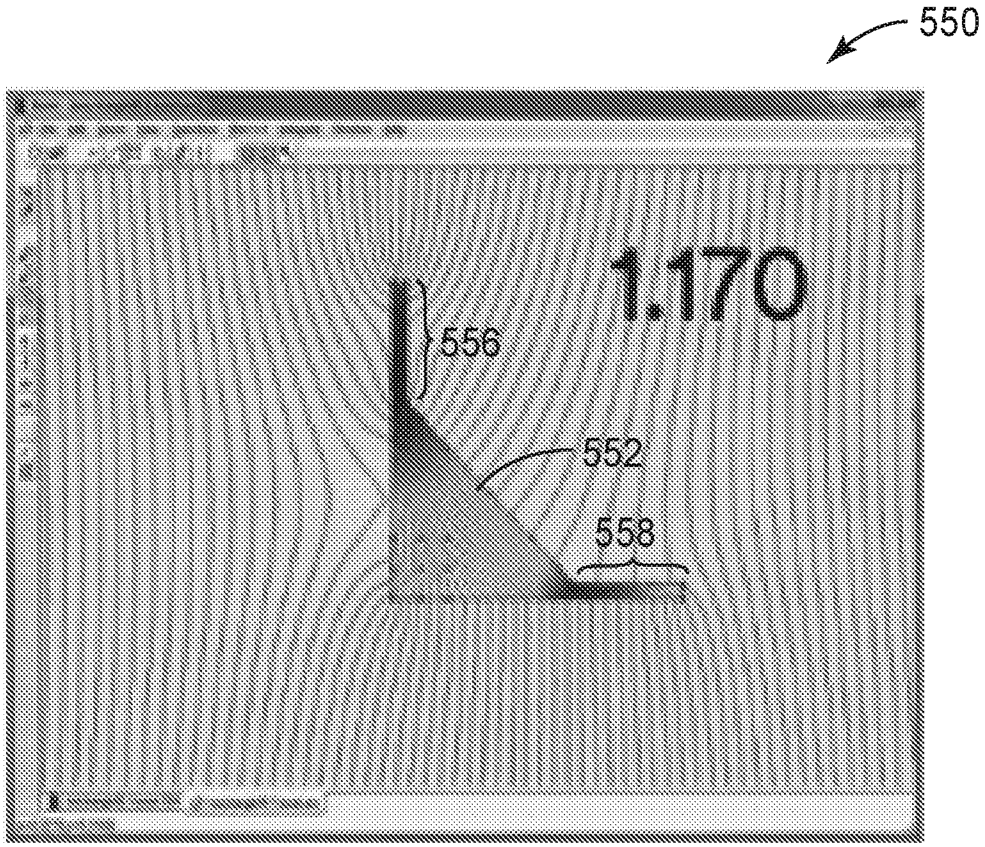

FIGS. 5C-5E illustrate triangle shaped abrasive particles with a sacrificial portion added on either end of the hypotenuse. The sacrificial portions, in one embodiment, are in line with the non-hypotenuse edges of the triangle. The sacrificial portions, in one embodiment, are coplanar with respect to the triangle portion of the shaped abrasive particle. However, it is expressly contemplated that other positions of the sacrificial portion, or portions, are possible, such as those in-line with the hypotenuse, or positioned such that they are not in line with any edge. For FIGS. 5C-5E, the width of each of the sacrificial portions is 0.05 units, and the sacrificial portions have the same thickness as the triangular portion of the shaped abrasive particle.

FIG. 5C illustrates a depiction 530 of a particle with a hypotenuse having a length 532 of 1 unit, and a first sacrificial portion 536 and a second sacrificial portion 538, each having a length of 0.15 units. Particle 530 experiences a relative magnetic torque of 0.859.

FIG. 5D illustrates a depiction 530 of a particle with a hypotenuse having a length 542, and a first sacrificial portion 546 and a second sacrificial portion 548. The sacrificial portions 546 and 548 each have a length of 0.25 units. Particle 540 experiences a relative magnetic torque of 1.021, which is higher than rod 510.

FIG. 5E illustrates a depiction 550 of a particle with a hypotenuse having a length 552 and a first sacrificial portion 556 and a second sacrificial portion 558. The sacrificial portions 556 and 558 each have a length of 0.35 units. Particle 550 experiences a relative magnetic torque of 1.170, which is higher than rod 510.

FIGS. 5A-5E illustrate sacrificial portions that are symmetrically present with respect to the hypotenuse of a triangular particle. However, it is expressly contemplated that asymmetrical sacrificial portions may also be used. A symmetric design may be useful in that it does not matter which non-hypotenuse edge contacts the backing—because of the symmetry of the particle, the profile of the particle on the backing is the same either way. However, for a particle shape where a particular 'stand up' orientation is desired, it is possible to use an asymmetric sacrificial portion, or multiple portions, to cause a preferred cutting face to align perpendicular to the backing and parallel to the preferred cutting faces of other particles.

In addition to altering the net magnetic torque of a shaped abrasive particle, the addition of a sacrificial portion can provide structural and performance benefits over similarly shaped abrasive particles without a sacrificial portion. For example, as illustrated in FIGS. 10B and 10D, discussed in greater detail below, a sacrificial portion 1064 coupled to a base face 1062 may provides additional surface area to embed into make coat make coat 1020. Additionally, because of the geometry of a cutting face sacrificial portion 1068, when exposed to a worksurface, will fracture at the fracture point, resulting in a sharp edge 1078.

Figure 6:
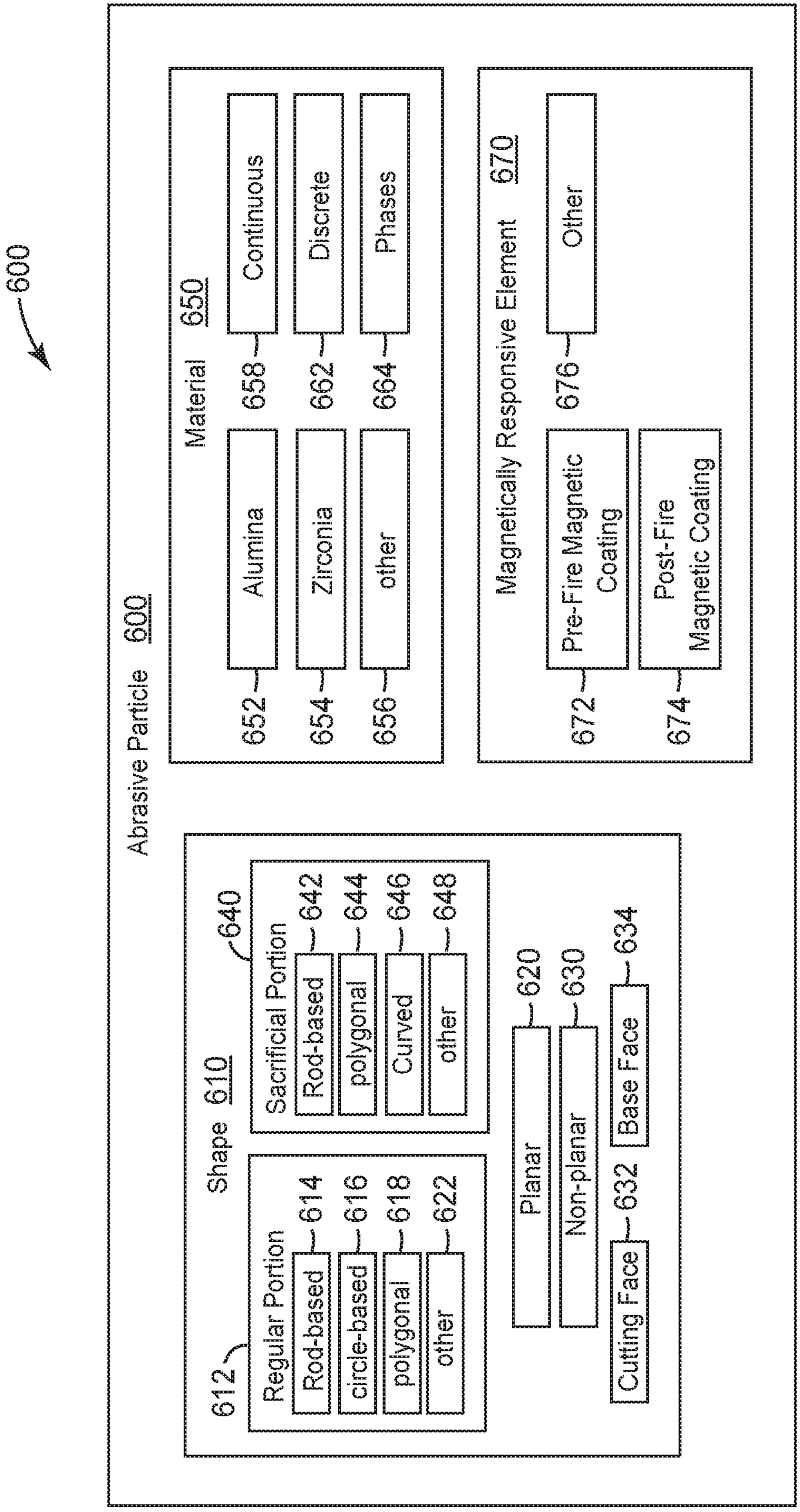
FIG. 6 illustrates components of a shaped abrasive particle according to embodiments of the present invention.

FIG. 6 illustrates components of a shaped abrasive particle. A shaped abrasive particle 600 has a precisely engineered shape 610. The shape 610 includes a regular portion 612 and a sacrificial portion 640. The regular portion 612 may be similar to a rod-shape 614, a circle 616, a polygon 622, or another shape. The term regular, as in regular portion 612, refers to a repeated shape seen in a plurality of abrasive particles 600 within an abrasive article. Regular may include regular shapes such as regular polygonal shapes, or it may include other shapes such as stars, crescents, or other irregular shapes. Sacrificial portion 640, in some embodiments, refers to a portion of abrasive particle 600 that breaks off during or before a first abrading operation of the abrasive article and does not provide substantially any abrasive effect on a workpiece. In some embodiments, a sacrificial portion 640 remains coupled to regular portion 612 during an abrading operation, but does not substantially contribute to the abrasive effect of the abrasive particle 600.

Sacrificial portion 640 may also be defined as lasting less than a full use life of an article. For example, if an abrasive article is intended to last for 100 hours of use, then sacrificial portion 640 lasts less than 100 hours of use. For example, sacrificial portion 640 may last less than 10% of a useful life of an abrasive article, or less than 5%, or less than 4%, or less than 3%, or less than 2%, or less than 1%, or less than 0.5%, or less than 0.1%, or less than 0.01%.

Sacrificial portion 640 may have a shape, and may be a rod-shape 642, or a polygon shape 644, such as the rectangular prisms illustrated in FIGS. 5C-5E. Sacrificial portion 640 may be straight or may have curvature 646. Sacrificial portion 640 may also have other defining features 648.

While a single sacrificial portion 640 is illustrated in FIG. 6, it is expressly contemplated that a pair of sacrificial portions 640 may be present, as illustrated in FIGS. 5C-5E. However, in some embodiments, there may be even more sacrificial portions 640, such as 3, 4, 5 or more. In some embodiments, at least one sacrificial portion 640 is positioned such that is planar 620 with at least part of regular portion 612. However, in some embodiments, at least one sacrificial portion 640 is non-planar 630 with regular portion 612.

Shape 610 may include one or more cutting faces 632 intended to be angled away from a coated abrasive article backing such that cutting face 632 interacts with a work surface during an abrading operation. Shape 610 may also include one or more base faces 634 intended to couple to an abrasive article backing, either directly, or embedded into a make resin.

Shaped abrasive particle is formed of a material 650. Material 650 may be a ceramic material, in one embodiment. Material 650 may be an alumina-based material 652, or a zirconia-based material 654, or another material 656. While not illustrated in FIG. 6, it is expressly contemplated that material 650 may be a doped material, as described herein. Material 650 may be a continuous material 658 comprising a single material or a substantially blend of materials. Material 650 may also contain discrete portions 662, which may be doped more heavily, formed of a different material, or have a different blend of material, for example. Additionally, material 650 may contain one or more phases 664 of different materials.

Shaped abrasive particle 600 may, in some embodiments, also include a magnetically responsive element 670. Magnetically responsive element 670 may include a magnetic coating applied before particle firing 672, as described in U.S. Provisional Nos. 62/914,778 filed on Oct. 14, 2019 and 62/875,700 filed Jul. 18, 2019, and 62/924,956, filed Oct. 23, 2019, or after firing, as described in PCT Pat. Appl. Publ. Nos. WO2018/080703 (Nelson et al.), WO2018/080756 (Eckel et al.), WO2018/080704 (Eckel et al.), WO2018/080705 (Adefris et al.), WO2018/080765 (Nelson et al.), WO2018/080784 (Eckel et al.), WO2018/136271 (Eckel et al.), WO2018/134732 (Nienaber et al.), WO2018/080755 (Martinez et al.), WO2018/080799 (Nienaber et al.), WO2018/136269 (Nienaber et al.), WO2018/136268 (Jesme et al.), WO2019/207415 (Nienaber et al.), WO2019/207417 (Eckel et al.), WO2019/207416 (Nienaber et al.). In some embodiments, magnetically responsive element 670 may be part of material 650, or may be another treatment of abrasive particle 600 such that abrasive particle 600 is responsive to an applied magnetic field. However, in other embodiments, no magnetic coating is necessary as particles with some shapes herein may self-align, or may be aligned electrostatically.

FIGS. 7A-7J illustrate views of shaped abrasive particles in accordance with an embodiment of the present invention.

While many embodiments herein describe particle portions that are useful for orientation purposes, they may provide other benefits as well. For example, a curved sacrificial portion may not be able to fully retract within a mold, due to the mold shape, and will, in some embodiments, fracture partially or completely. Complete fracturing can result in a sharper tip or edge than is achievable by molding alone due to the limitations of mold design and release agent usage. In addition, a sharp edge or tip created from a fracture during the manufacturing process can reduce or eliminate the need for high precision in making of the master tool, thereby increasing speed of manufacture, tool making options, and reducing costs.

Figure 7A:
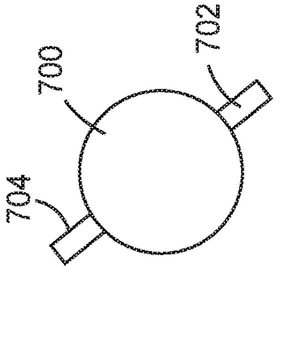
FIGS. 7A-7J illustrate views of shaped abrasive particles in accordance with an embodiment of the present invention.

FIG. 7A illustrates a spherical particle 700 with a first sacrificial portion 702 and a second sacrificial portion 704. Spherical, or near spherical particles are particularly difficult to orient. Orientation of a spherical particle may be desired, for example, if the particle has a preferred fracture orientation. First and second sacrificial portions 702, 704 may be similar sizes or different sizes, depending on a desired orientation of particle 700. First and second sacrificial portions 702, 704 may also each have a length between 10-100% of a diameter of particle 700. Sacrificial portions 702, 704 are each positioned orthogonally to the surface of particle 700, in the embodiment of FIG. 7A, however it is expressly contemplated that either or both of sacrificial portions 702, 704 could be positioned at another angle with respect to the surface of particle 700.

Figure 7B:
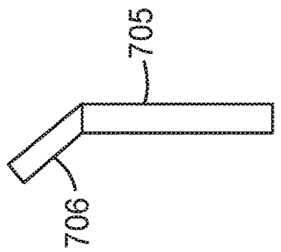

FIG. 7B illustrates a rod-shaped particle 705 with a single sacrificial portion 706. However, while a single sacrificial portion 706 is illustrated at a first end of rod 705, it is expressly contemplated that another sacrificial portion could be positioned at a second end, or along a length, of rod 705. Sacrificial portion 706 is illustrated at an angle from an axis defined by a length of rod 705. However, it is expressly contemplated that sacrificial portion 706 may be collinear with rod 705, and may be a portion that extends far enough beyond a size and/or supersize coat that it fractures off during a first abrading operation. Sacrificial portion 706 may cause rod 705 to be perpendicular to a backing of a coated abrasive article, such that it couples to a backing either directly or through a make coat.

Figure 7C:
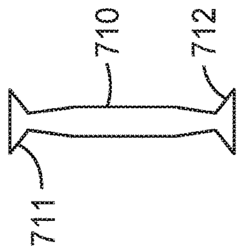

FIG. 7C illustrates a particle 710 with a first sacrificial portion 711 and a second sacrificial portion 712. As illustrated in FIG. 7C, in some embodiments, sacrificial portions 711 and 712 are similarly shaped, such that both include a tapered edge. However, in other embodiments, either or both of sacrificial portions 711 and 712 may be rod-shaped.

Figure 7D:
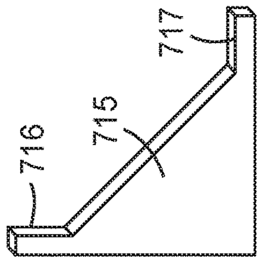

FIG. 7D illustrates a particle 715 has a first sacrificial portion 716 and a second sacrificial portion 717. As illustrated in FIG. 7D, both sacrificial portions 716 and 717 are rectangular shaped. However, it is expressly contemplated that either or both sacrificial portions 716, 717 may be cylindrical, or another suitable shape. Additionally, while sacrificial portions 716, 717 are illustrated as coplanar with the triangular portion of particle 715, it is expressly contemplated that either or both sacrificial portions 716, 717 may not be coplanar with the triangular portion. Sacrificial portions 716, 717 are illustrated in FIG. 7D as, in some embodiments, being colinear with a non-hypotenuse edge of particle 715. However, either or both of sacrificial portions 716, 717 may also be nonlinear with either or both non-hypotenuse edges of particles 715. Additionally, while sacrificial portions 716, 717 are illustrated as positioned at the first and second end of a hypotenuse edge of particle 715, it is expressly contemplated that they may be placed at other suitable positions.

Figure 7E:
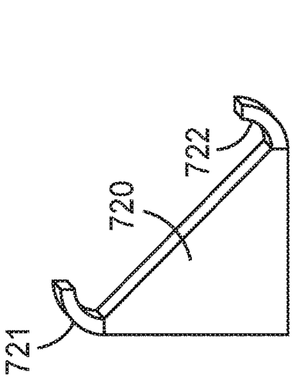

FIG. 7E illustrates a particle 720 with a first sacrificial portion 721 and a second sacrificial portion 722. Similar to particle 715, particle 720 has sacrificial portions 721, 722 positioned at a first and second end of a hypotenuse edge. However, first and second sacrificial portions 721, 722 have curvature. The curvature may be imparted through the molding process, or through the firing process. While first and second sacrificial portions 721, 722 are illustrated as being on either end of a hypotenuse edge, in one embodiment, it is expressly contemplated that they may be in other suitable positions.

The curvature of sacrificial portions 721, 722 in FIG. 7E also have an added effect that, during a particle drying process, portions 721, 722 will not be able to shrink and will fracture, leaving a generally triangle shaped particle 720 with sharp edges at two corners.

FIGS. 7B-7E illustrate embodiments where sacrificial portions are coplanar with a regular portion of an abrasive particle. However, in some embodiments, such as those illustrated in FIGS. 7F-7I, sacrificial portions may not be coplanar.

Figure 7F:
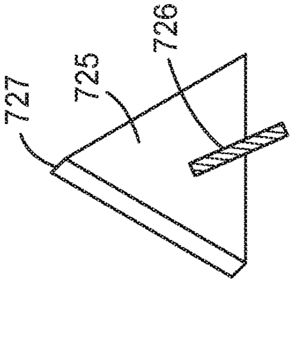

FIG. 7F illustrates an embodiment with a particle 725 and a sacrificial portion 726 that is angled away from a face of particle 725. Sacrificial portion 726 may be positioned at an angle such that it functions as a 'kickstand' for particle 725, such that a cutting edge 727 is angled with respect to a backing of a coated abrasive article. Cutting edge 727 may be parallel with a backing, in one embodiment, or may be at an angle.

Figure 7G:
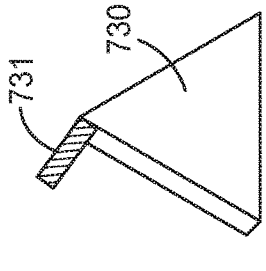

FIG. 7G illustrates a particle 730 with a sacrificial portion 731. Sacrificial portion 731 is illustrated, in one embodiment, at an angle with respect to a triangular face of particle 730. However, sacrificial portion 731 may be coplanar with the triangular face, in another embodiment.

Figure 7H:
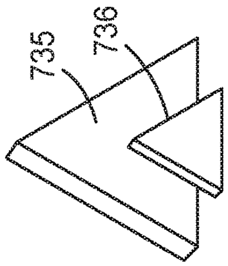
Figure 7I:
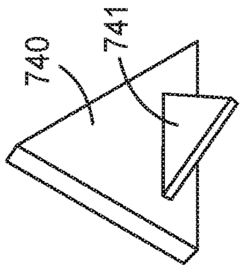

FIGS. 7H and 7I illustrate particles 735 and 740, with sacrificial portions 736, 741, respectively. Sacrificial portions 736, 741 are coupled to a side face of particles 735, 701 and are configured to couple to a backing of a coated abrasive article. While a single sacrificial portion is illustrated for each of particles 735, 740, it is expressly contemplated that additional sacrificial portion(s) may be present.

Figure 7J:
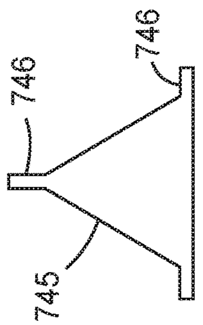

FIG. 7J illustrates a particle 745 with an equilateral triangle shape. Particle 745 has three sacrificial portions 746, each extending from a vertex of the equilateral triangle shape.

While FIGS. 7D-7J illustrate right or equilateral triangles, it is expressly contemplated that other polygonal shapes can serve as the basis for an abrasive particle. For example, another triangle shape, such as a scalene, isosceles, equilateral, acute or obtuse triangle may also serve as a theoretical polygonal shape for an abrasive particle, with a defect designed to similarly effect a net magnetic torque on the particle. Additionally, a parallelogram, rectangle, square or other four-sided shape may also serve as a theoretical polygonal basis for an abrasive particle. Other polygons may also be suitable, including five-stared shapes like stars, pentagons. Additionally shapes with curved edges, such as crescents may also be suitable. Other shapes may also be suitable, like crosses.

The shape of each face of an abrasive particle, can be controlled, in part, by varying the length of either a height, a width, or a radius. While each edge can have any suitable length, each edge can generally have a length in a range of from about 0.01 mm to about 10 mm, about 0.03 mm to about 5 mm, less than, equal to, or greater than about 0.01 mm, 0.05, 0.1, 0.5, 1, 1.5, 2, 2.5, 3, 3.5, 4, 4.5, 5, 5.5, 6, 6.5, 7, 7.5, 8, 8.5, 9, 9.5, or about 10 mm.

Shaped abrasive particles may be used on a coated abrasive article, for example, such as the belt illustrated in FIG. 1. The backing can have any desirable degree of flexibility. The backing can include any suitable material. For example, the backing can include a polymeric film, a metal foil, a woven fabric, a knitted fabric, paper, a vulcanized fiber, a nonwoven, a foam, a screen, a laminate, or combinations thereof. The backing can further include various additive(s). Examples of suitable additives include colorants, processing aids, reinforcing fibers, heat stabilizers, UV stabilizers, and antioxidants. Examples of useful fillers include clays, calcium carbonate, glass beads, talc, clays, mica, wood flour; and carbon black.

At least some particles described herein can be characterized as having two portions, a cutting portion and a base portion. The cutting portion and the base portion are connected and can be imagined as forming two edges of a triangle. The cutting portion and the base portion may join at a 90° angle, or may join such that the particle has a controlled rake angle between −60° and 60°.

The cutting portion and the base portion, in some embodiments, are similarly shaped such that either can serve as the cutting portion or the base portion. The base portion is designed to be parallel to, and fixed to, a backing. When the base portion is fixed to the backing, the cutting portion will be angled away from the backing, at an angle anywhere between 30°-129° with respect to the backing.

The ratio of the height to the maximum thickness of the cutting portion is between 1.5 and 20. The ratio of the length of the base portion to the average width of the base portion is between 2 and 10. The width of the cutting edge is between 10% and 1000% of the height of the cutting edge.

The particles described herein are all envisioned to be responsive to a magnetic field. For example, the particles may include magnetic material or may have a magnetic coating applied before or after firing. The magnetic responsiveness allows the particles to align in a preferred alignment when exposed to a suitable magnetic field. The particles are designed to experience a magnetic torque that is greater than a force of gravity on the particle, causing the particle to 'stand up' with a base edge facing a backing. The aspect ratio of both the cutting portion and the base portion need to be in a range such that the particles are aligned in a 90° orientation and are standing upright.

Figure 8:
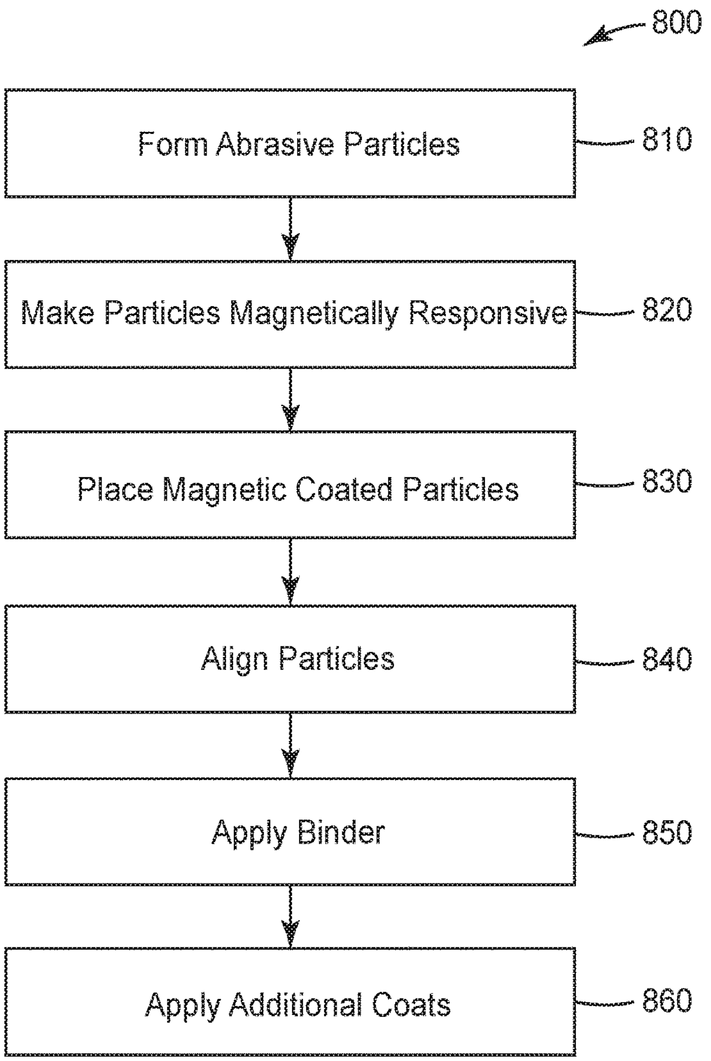
FIG. 8 illustrates a method of making a coated abrasive article in accordance with an embodiment of the present invention.

FIG. 8 illustrates a method of making a coated abrasive article in accordance with an embodiment of the present invention. The method of FIG. 8 may be suitable for forming any of the particles described in FIG. 5 or 7. Such a method may also be suitable for forming particles of other shapes. Additionally, while method 800 is described as a sequential set of steps, it is expressly contemplated that, for some applications, the steps described below may occur in a different order. For example, the steps of 830, 840 and 850 may occur in different orders depending on the particle, binder or coating compositions, for example.

In block 810, abrasive particles are formed. The abrasive particles may be formed with magnetic material such that they are magnetically responsive, in one embodiment.

Abrasive particles are formed, in step 810, with a shape that experiences a net magnetic torque that causes the particles, when exposed to a magnetic field, will cause the particles to orient such that a majority of cutting faces the abrasive particles are aligned with each other. Additionally, particles are aligned such that a majority of bases are in contact with, or directly joinable to, a backing material.

While many embodiments discussed herein envision a particle with parallel surfaces, other shapes are also expressly contemplated. Additionally, while a cutting edge is described, it is also contemplated that a cutting tip may be present in some embodiments.

Abrasive particles can be formed from many suitable materials or combinations of materials. For example, shaped abrasive particle can comprise a ceramic material or a polymeric material. Useful ceramic materials include, for example, fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minnesota, alpha-alumina, zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, diamond, cubic boron nitride, sol-gel derived ceramics (e.g., alumina ceramics doped with an additive), silica (e.g., quartz, glass beads, glass bubbles and glass fibers) and the like, or a combination thereof. Examples of sol-gel derived crushed ceramic particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). A modifying additive can function to enhance some desirable property of the abrasive or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, calcium, strontium, yttrium, praseodymium, samarium, ytterbium, neodymium, lanthanum, gadolinium, cerium, dysprosium, erbium, titanium, and mixtures thereof. The particular concentrations of these additives that can be present in the abrasive dispersion can be varied based on skill in the art. Further details concerning methods of making sol-gel-derived abrasive particles can be found in, for example, U.S. Pat. No. 4,314,827 (Leitheiser), U.S. Pat. No. 5,152,917 (Pieper et al.), U.S. Pat. No. 5,213,591 (Celikkaya et al.), U.S. Pat. No. 5,435,816 (Spurgeon et al.), U.S. Pat. No. 5,672,097 (Hoopman et al.), U.S. Pat. No. 5,946,991 (Hoopman et al.), U.S. Pat. No. 5,975,987 (Hoopman et al.), and U.S. Pat. No. 6,129,540 (Hoopman et al.), and in U.S. Publ. Pat. Appln. Nos. 2009/0165394 A1 (Culler et al.) and 2009/0169816 A1 (Erickson et al.).

Shaped abrasive particles that include a polymeric material can be characterized as soft abrasive particles. Soft shaped abrasive particles can include any suitable material or combination of materials. For example, the soft shaped abrasive particles can include a reaction product of a polymerizable mixture including one or more polymerizable resins. The one or more polymerizable resins are chosen from a phenolic resin, a urea formaldehyde resin, a urethane resin, a melamine resin, an epoxy resin, a bismaleimide resin, a vinyl ether resin, an aminoplast resin (which may include pendant alpha, beta unsaturated carbonyl groups), an acrylate resin, an acrylated isocyanurate resin, an isocyanurate resin, an acrylated urethane resin, an acrylated epoxy resin, an alkyl resin, a polyester resin, a drying oil, or mixtures thereof. The polymerizable mixture can include additional components such as a plasticizer, an acid catalyst, a cross-linker, a surfactant, a mild-abrasive, a pigment, a catalyst and an antibacterial agent.

Where multiple components are present in the polymerizable mixture, those components can account for any suitable weight percentage of the mixture. For example, the polymerizable resin or resins, may be in a range of from about 35 wt % to about 99.9 wt % of the polymerizable mixture, about 40 wt % to about 95 wt %, or less than, equal to, or greater than about 35 wt %, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or about 99.9 wt %.

If present, the cross-linker may be in a range of from about 2 wt % to about 60 wt % of the polymerizable mixture, from about 5 wt % to about 10 wt %, or less than, equal to, or greater than about 2 wt %, 3, 4, 5, 6, 7, 8, 9, 10, 11, 12, 13, 14, or about 15 wt %. Examples of suitable cross-linkers include a cross-linker available under the trade designation CYMEL 303 LF, of Allnex USA Inc., Alpharetta, Georgia, USA; or a cross-linker available under the trade designation CYMEL 385, of Allnex USA Inc., Alpharetta, Georgia, USA.

If present, the mild-abrasive may be in a range of from about 5 wt % to about 65 wt % of the polymerizable mixture, about 10 wt % to about 20 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or about 65 wt %. Examples of suitable mild-abrasives include a mild-abrasive available under the trade designation MINSTRON 353 TALC, of Imerys Talc America, Inc., Three Forks, Montana, USA; a mild-abrasive available under the trade designation USG TERRA ALBA NO.1 CALCIUM SULFATE, of USG Corporation, Chicago, Illinois, USA; Recycled Glass (40-70 Grit) available from ESCA Industries, Ltd., Hatfield, Pennsylvania, USA, silica, calcite, nepheline, syenite, calcium carbonate, or mixtures thereof.

If present, the plasticizer may be in a range of from about 5 wt % to about 40 wt % of the polymerizable mixture, about 10 wt % to about 15 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or about 40 wt %. Examples of suitable plasticizers include acrylic resins or styrene butadiene resins. Examples of acrylic resins include an acrylic resin available under the trade designation RHOPLEX GL-618, of DOW Chemical Company, Midland, Michigan, USA; an acrylic resin available under the trade designation HYCAR 2679, of the Lubrizol Corporation, Wickliffe, Ohio, USA; an acrylic resin available under the trade designation HYCAR 26796, of the Lubrizol Corporation, Wickliffe, Ohio, USA; a polyether polyol available under the trade designation ARCOL LG-650, of DOW Chemical Company, Midland, Michigan, USA; or an acrylic resin available under the trade designation HYCAR 26315, of the Lubrizol Corporation, Wickliffe, Ohio, USA. An example of a styrene butadiene resin includes a resin available under the trade designation ROVENE 5900, of Mallard Creek Polymers, Inc., Charlotte, North Carolina, USA.

If present, the acid catalyst may be in a range of from 1 wt % to about 20 wt % of the polymerizable mixture, about 5 wt % to about 10 wt %, or less than, equal to, or greater than about 1 wt %, 2, 3, 4, 5, 6, 7, 8, 9, 10, 11, 12, 13, 14, 15, 16, 17, 18, 19, or about 20 wt %. Examples of suitable acid catalysts include a solution of aluminum chloride or a solution of ammonium chloride.

If present, the surfactant can be in a range of from about 0.001 wt % to about 15 wt % of the polymerizable mixture about 5 wt % to about 10 wt %, less than, equal to, or greater than about 0.001 wt %, 0.01, 0.5, 1, 2, 3, 4, 5, 6, 7, 8, 9, 10, 11, 12, 13, 14, or about 15 wt %. Examples of suitable surfactants include a surfactant available under the trade designation GEMTEX SC-85-P, of Innospec Performance Chemicals, Salisbury, North Carolina, USA; a surfactant available under the trade designation DYNOL 604, of Air Products and Chemicals, Inc., Allentown, Pennsylvania, USA; a surfactant available under the trade designation ACRYSOL RM-8W, of DOW Chemical Company, Midland, Michigan, USA; or a surfactant available under the trade designation XIAMETER AFE 1520, of DOW Chemical Company, Midland, Michigan, USA.

If present, the antimicrobial agent may be in a range of from 0.5 wt % to about 20 wt % of the polymerizable mixture, about 10 wt % to about 15 wt %, or less than, equal to, or greater than about 0.5 wt %, 1, 2, 3, 4, 5, 6, 7, 8, 9, 10, 11, 12, 13, 14, 15, 16, 17, 18, 19, or about 20 wt %. An example of a suitable antimicrobial agent includes zinc pyrithione.

If present, the pigment may be in a range of from about 0.1 wt % to about 10 wt % of the polymerizable mixture, about 3 wt % to about 5 wt %, less than, equal to, or greater than about 0.1 wt %, 0.2, 0.4, 0.6, 0.8, 1, 1.5, 2, 2.5, 3, 3.5, 4, 4.5, 5, 5.5, 6, 6.5, 7, 7.5, 8, 8.5, 9, 9.5, or about 10 wt %. Examples of suitable pigments include a pigment dispersion available under the trade designation SUNSPERSE BLUE 15, of Sun Chemical Corporation, Parsippany, New Jersey, USA; a pigment dispersion available under the trade designation SUNSPERSE VIOLET 23, of Sun Chemical Corporation, Parsippany, New Jersey, USA; a pigment dispersion available under the trade designation SUN BLACK, of Sun Chemical Corporation, Parsippany, New Jersey, USA; or a pigment dispersion available under the trade designation BLUE PIGMENT B2G, of Clariant Ltd., Charlotte, North Carolina, USA.

Shaped abrasive particle is a monolithic abrasive particle. As shown, shaped abrasive particle is free of a binder and is not an agglomeration of abrasive particles held together by a binder or other adhesive material.

Shaped abrasive particle can be formed in many suitable manners for example, the shaped abrasive particle can be made according to a multi-operation process. The process can be carried out using any material or precursor dispersion material. Briefly, for embodiments where shaped abrasive particles are monolithic ceramic particles, the process can include the operations of making either a seeded or non-seeded precursor dispersion that can be converted into a corresponding (e.g., a boehmite sol-gel that can be converted to alpha alumina); filling one or more mold cavities having the desired outer shape of shaped abrasive particle with a precursor dispersion; drying the precursor dispersion to form precursor shaped abrasive particle; removing the precursor shaped abrasive particle from the mold cavities; calcining the precursor shaped abrasive particle to form calcined, precursor shaped abrasive particle; and then sintering the calcined, precursor shaped abrasive particle to form shaped abrasive particle. The process will now be described in greater detail in the context of alpha-alumina-containing shaped abrasive particle. In other embodiments, the mold cavities may be filled with a melamine to form melamine shaped abrasive particles.

The process can include the operation of providing either a seeded or non-seeded dispersion of a precursor that can be converted into ceramic. In examples where the precursor is seeded, the precursor can be seeded with an oxide of an iron (e.g., FeO). The precursor dispersion can include a liquid that is a volatile component. In one example, the volatile component is water. The dispersion can include a sufficient amount of liquid for the viscosity of the dispersion to be sufficiently low to allow filling mold cavities and replicating the mold surfaces, but not so much liquid as to cause subsequent removal of the liquid from the mold cavity to be prohibitively expensive. In one example, the precursor dispersion includes from 2 percent to 90 percent by weight of the particles that can be converted into ceramic, such as particles of aluminum oxide monohydrate (boehmite), and at least 10 percent by weight, or from 50 percent to 70 percent, or 50 percent to 60 percent, by weight, of the volatile component such as water. Conversely, the precursor dispersion in some embodiments contains from 30 percent to 50 percent, or 40 percent to 50 percent solids by weight.

Examples of suitable precursor dispersions include zirconium oxide sols, vanadium oxide sols, cerium oxide sols, aluminum oxide sols, and combinations thereof. Suitable aluminum oxide dispersions include, for example, boehmite dispersions and other aluminum oxide hydrates dispersions. Boehmite can be prepared by known techniques or can be obtained commercially. Examples of commercially available boehmite include products having the trade designations "DISPERAL" and "DISPAL", both available from Sasol North America, Inc., or "HIQ-40" available from BASF Corporation. These aluminum oxide monohydrates are relatively pure; that is, they include relatively little, if any, hydrate phases other than monohydrates, and have a high surface area.

The physical properties of the resulting shaped abrasive particle can generally depend upon the type of material used in the precursor dispersion. As used herein, a "gel" is a three-dimensional network of solids dispersed in a liquid.

The precursor dispersion can contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, such as water-soluble salts. They can include a metal-containing compound and can be a precursor of an oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the precursor dispersion can be varied.

The introduction of a modifying additive or precursor of a modifying additive can cause the precursor dispersion to gel. The precursor dispersion can also be induced to gel by application of heat over a period of time to reduce the liquid content in the dispersion through evaporation. The precursor dispersion can also contain a nucleating agent. Nucleating agents suitable for this disclosure can include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina.

A peptizing agent can be added to the precursor dispersion to produce a more stable hydrosol or colloidal precursor dispersion. Suitable peptizing agents are monoprotic acids or acid compounds such as acetic acid, hydrochloric acid, formic acid, and nitric acid. Multiprotic acids can also be used, but they can rapidly gel the precursor dispersion, making it difficult to handle or to introduce additional components. Some commercial sources of boehmite contain an acid titer (such as absorbed formic or nitric acid) that will assist in forming a stable precursor dispersion.

The precursor dispersion can be formed by any suitable means; for example, in the case of a sol-gel alumina precursor, it can be formed by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired.

A further operation can include providing a mold having at least one mold cavity, or a plurality of cavities formed in at least one major surface of the mold. In some examples, the mold is formed as a production tool, which can be, for example, a belt, a sheet, a continuous web, a coating roll such as a rotogravure roll, a sleeve mounted on a coating roll, or a die. In one example, the production tool can include polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one example, the entire tooling is made from a polymeric or thermoplastic material. In another example, the surfaces of the tooling in contact with the precursor dispersion while the precursor dispersion is drying, such as the surfaces of the plurality of cavities, include polymeric or thermoplastic materials, and other portions of the tooling can be made from other materials. A suitable polymeric coating can be applied to a metal tooling to change its surface tension properties, for example.

A polymeric or thermoplastic production tool can be replicated off a metal master tool. The master tool can have the inverse pattern of that desired for the production tool. The master tool can be made in the same manner as the production tool. In one example, the master tool is made out of metal (e.g., nickel) and is diamond-turned. In one example, the master tool is at least partially formed using stereolithography. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that can distort the thermoplastic production tool, limiting its life.

Access to cavities can be from an opening in the top surface or bottom surface of the mold. In some examples, the cavities can extend for the entire thickness of the mold. Alternatively, the cavities can extend only for a portion of the thickness of the mold. In one example, the top surface is substantially parallel to the bottom surface of the mold with the cavities having a substantially uniform depth. At least one side of the mold, the side in which the cavities are formed, can remain exposed to the surrounding atmosphere during the step in which the volatile component is removed.

The cavities have a specified three-dimensional shape to make shaped abrasive particle. The depth dimension is equal to the perpendicular distance from the top surface to the lowermost point on the bottom surface. The depth of a given cavity can be uniform or can vary along its length and/or width. The cavities of a given mold can be of the same shape or of different shapes.

A further operation involves filling the cavities in the mold with the precursor dispersion (e.g., by a conventional technique). In some examples, a knife roll coater or vacuum slot die coater can be used. A mold release agent can be used to aid in removing the particles from the mold if desired. Examples of mold release agents include oils such as peanut oil or mineral oil, fish oil, silicones, polytetrafluoroethylene, zinc stearate, and graphite. In general, a mold release agent such as peanut oil, in a liquid, such as water or alcohol, is applied to the surfaces of the production tooling in contact with the precursor dispersion such that from about 0.1 mg/in$^2$ (0.6 mg/cm$^2$) to about 3.0 mg/in$^2$ (20 mg/cm$^2$), or from about 0.1 mg/in$^2$ (0.6 mg/cm$^2$) to about 5.0 mg/in$^2$ (30 mg/cm$^2$), of the mold release agent is present per unit area of the mold when a mold release is desired. In some embodiments, the top surface of the mold is coated with the precursor dispersion. The precursor dispersion can be pumped onto the top surface.

In a further operation, a scraper or leveler bar can be used to force the precursor dispersion fully into the cavity of the mold. The remaining portion of the precursor dispersion that does not enter the cavity can be removed from the top surface of the mold and recycled. In some examples, a small portion of the precursor dispersion can remain on the top surface, and in other examples the top surface is substantially free of the dispersion. The pressure applied by the scraper or leveler bar can be less than 100 psi (0.6 MPa), or less than 50 psi (0.3 MPa), or even less than 10 psi (60 kPa). In some examples, no exposed surface of the precursor dispersion extends substantially beyond the top surface.

In those examples where it is desired to have the exposed surfaces of the cavities result in planar faces of the shaped abrasive particles, it can be desirable to overfill the cavities (e.g., using a micronozzle array) and slowly dry the precursor dispersion.

A further operation involves removing the volatile component to dry the dispersion. The volatile component can be removed by fast evaporation rates. In some examples, removal of the volatile component by evaporation occurs at temperatures above the boiling point of the volatile component. An upper limit to the drying temperature often depends on the material the mold is made from. For polypropylene tooling, the temperature should be less than the melting point of the plastic. In one example, for a water dispersion of from about 40 to 50 percent solids and a polypropylene mold, the drying temperatures can be from about 90° C. to about 165° C., or from about 105° C. to about 150° C., or from about 105° C. to about 120° C. Higher temperatures can lead to improved production speeds but can also lead to degradation of the polypropylene tooling, limiting its useful life as a mold.

During drying, the precursor dispersion shrinks, often causing retraction from the cavity walls. For example, if the cavities have planar walls, then the resulting shaped abrasive particle can tend to have at least three concave major sides. It is presently discovered that by making the cavity walls concave (whereby the cavity volume is increased) it is possible to obtain shaped abrasive particle that have at least three substantially planar major sides. The degree of concavity generally depends on the solids content of the precursor dispersion.

Additionally, as described with respect to FIG. 7E, some particle shapes described herein are designed to take advantage of the retraction of the particle precursor. For example, a curved sacrificial portion will not be able to retract within a mold, due to the mold shape, and will, in some embodiments, fracture partially or completely. Complete fracturing can result in a sharper tip or edge than is achievable by molding alone due to the limitations of mold design and release agent usage. In addition, a sharp edge or tip created from a fracture during the manufacturing process can reduce or eliminate the need for high precision in making of the master tool, thereby increasing speed of manufacture, tool making options, and reducing costs.

A further operation involves removing resultant precursor shaped abrasive particle from the mold cavities. The precursor shaped abrasive particle can be removed from the cavities by using the following processes alone or in combination on the mold: gravity, vibration, ultrasonic vibration, vacuum, or pressurized air to remove the particles from the mold cavities.

The precursor shaped abrasive particle can be further dried outside of the mold. If the precursor dispersion is dried to the desired level in the mold, this additional drying step is not necessary. However, in some instances it can be economical to employ this additional drying step to minimize the time that the precursor dispersion resides in the mold. The precursor shaped abrasive particle will be dried from 10 to 480 minutes, or from 120 to 400 minutes, at a temperature from 50° C. to 160° C., or 120° C. to 150° C.

A further operation involves calcining the precursor shaped abrasive particle.

During calcining, essentially all the volatile material is removed, and the various components that were present in the precursor dispersion are transformed into metal oxides. The precursor shaped abrasive particle are generally heated to a temperature from 400° C. to 800° C. and maintained within this temperature range until the free water and over 90 percent by weight of any bound volatile material are removed. In an optional step, it can be desirable to introduce the modifying additive by an impregnation process. A water-soluble salt can be introduced by impregnation into the pores of the calcined, precursor shaped abrasive particle. Then the precursor shaped abrasive particle are pre-fired again.

A further operation can involve sintering the calcined, precursor shaped abrasive particle to form the abrasive particles. In some examples where the precursor includes rare earth metals, however, sintering may not be necessary. Prior to sintering, the calcined, precursor shaped abrasive particle are not completely densified and thus lack the desired hardness to be used as shaped abrasive particle. Sintering takes place by heating the calcined, precursor shaped abrasive particle to a temperature of from 1000° C. to 1650° C. The length of time for which the calcined, precursor shaped abrasive particle can be exposed to the sintering temperature to achieve this level of conversion depends upon various factors, but from five seconds to 48 hours is possible.

In another embodiment, the duration of the sintering step ranges from one minute to 90 minutes. After sintering, the shaped abrasive particle 14 can have a Vickers hardness of 10 GPa (gigaPascals), 16 GPa, 18 GPa, 20 GPa, or greater.

Additional operations can be used to modify the described process, such as, for example, rapidly heating the material from the calcining temperature to the sintering temperature, and centrifuging the precursor dispersion to remove sludge and/or waste. Moreover, the process can be modified by combining two or more of the process steps if desired.

To form soft shaped abrasive particle the polymerizable mixtures described herein can be deposited in a cavity. The cavity can have a shape corresponding to the negative impression of the desired shaped abrasive particle. After the cavity is filled to the desired degree, the polymerizable mixture is cured therein. Curing can occur at room temperature (e.g., about 25° C.) or at any temperature above room temperature. Curing can also be accomplished by exposing the polymerizable mixture to a source of electromagnetic radiation or ultraviolet radiation.

Shaped abrasive particles can be independently sized according to an abrasives industry recognized specified nominal grade. Abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F18, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Any one of the surfaces of a shaped abrasive particle can include a surface feature such as a substantially planar surface; a substantially planar surface having a triangular, rectangular, hexagonal, or other polygonal perimeter; a concave surface; a convex surface; an aperture; a ridge; a line or a plurality of lines; a protrusion; a point; or a depression. The surface feature can be chosen to change the cut rate, reduce wear of the formed abrasive particles, or change the resulting finish of an abrasive article. Additionally, a shaped abrasive particle 300 can have a combination of the above shape elements (e.g., convex sides, concave sides, irregular sides, and planar sides).

The shaped abrasive particles can have at least one sidewall, which may be a sloping sidewall. In some embodiments, more than one (for example two or three) sloping sidewall can be present and the slope or angle for each sloping sidewall may be the same or different. In other embodiments, the sidewall can be minimized for particles where the first and the second faces taper to a thin edge or point where they meet instead of having a sidewall. The sloping sidewall can also be defined by a radius, R (as illustrated in FIG. 5B of US Patent Application No. 2010/0151196). The radius, R, can be varied for each of the sidewalls.

Specific examples of shaped particles having a ridge line include roof-shaped particles, for example particles as illustrated, in FIG. 4A to 4C of WO 2011/068714. Preferred, roof-shaped particles include particles having the shape of a hip roof, or hipped roof (a type of roof wherein any sidewalls facets present slope downwards from the ridge line to the first side. A hipped roof typically does not comprise vertical sidewall(s) or facet(s)).

Shaped abrasive particles can have one or more shape features selected from: an opening (preferably one extending or passing through the first and second side); at least one recessed (or concave) face or facet; at least one face or facet which is shaped outwardly (or convex); at least one side comprising a plurality of grooves; at least one fractured surface; a cavity, a low roundness factor; or a combination of one or more of said shape features.

Shaped abrasive particles 300 can also comprise a plurality of ridges on their surfaces. The plurality of grooves (or ridges) can be formed by a plurality of ridges (or grooves) in the bottom surface of a mold cavity that have been found to make it easier to remove the precursor shaped abrasive particles from the mold.

The plurality of grooves (or ridges) is not particularly limited and can, for example, comprise parallel lines which may or may not extend completely across the side. Preferably, the parallel lines intersect with the perimeter along a first edge at a 90° angle. The cross-sectional geometry of a groove or ridge can be a truncated triangle, triangle, or other geometry as further discussed in the following. In various embodiments of the invention, the depth, of the plurality of grooves can be between about 1 micrometer to about 400 micrometers.

According to another embodiment the plurality of grooves comprises a cross hatch pattern of intersecting parallel lines which may or may not extend completely across the face. In various embodiments, the cross hatch pattern can use intersecting parallel or non-parallel lines, various percent spacing between the lines, arcuate intersecting lines, or various cross-sectional geometries of the grooves. In other embodiments the number of ridges (or grooves) in the bottom surface of each mold cavity can be between 1 and about 100, or between 2 to about 50, or between about 4 to about 25 and thus form a corresponding number of grooves (or ridges) in the shaped abrasive particles.

Methods for making shaped abrasive particles having at least one sloping sidewall are for example described in US Patent Application Publication No. 2009/0165394. Methods for making shaped abrasive particles having an opening are for example described in US Patent Application Publication No. 2010/0151201 and 2009/0165394. Methods for making shaped abrasive particles having grooves on at least one side are for example described in US Patent Application Publication No. 2010/0146867. Methods for making dish-shaped abrasive particles are for example described in US Patent Application Publication Nos. 2010/0151195 and 2009/0165394. Methods for making shaped abrasive particles with low Roundness Factor are for example described in US Patent Application Publication No. 2010/0319269. Methods for making shaped abrasive particles with at least one fractured surface are for example described in US Patent Application Publication Nos. 2009/0169816 and 2009/0165394. Methods for making abrasive particles wherein the second side comprises a vertex (for example, dual tapered abrasive particles) or a ridge line (for example, roof shaped particles) are for example described in WO 2011/068714.

In block 820, the abrasive particles are made to be magnetically responsive. In one embodiment, making particles magnetically responsive comprises coating non-magnetically responsive particles with a magnetically responsive coating. However, in another embodiment, the particles are formed with magnetically responsive material, such that steps 810 and 820 are accomplished substantially simultaneously, for example as recited in co-owned provisional patent U.S. 62/914,778, filed on Oct. 14, 2019.

In addition to the materials already described, at least one magnetic material may be included within or coated to shaped abrasive particle. Examples of magnetic materials include iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, alloys of neodymium, iron and boron (e.g., $Nd_2Fe_{14}B$), and alloys of samarium and cobalt (e.g., SmCos); MnSb; $MnOFe_2O_3$; $Y_3Fe_5O_{12}$; $CrO_2$; MnAs; ferrites such as ferrite, magnetite; zinc ferrite; nickel ferrite; cobalt ferrite, magnesium ferrite, barium ferrite, and strontium ferrite; yttrium iron garnet; and combinations of the foregoing. In some embodiments, the magnetizable material is an alloy containing 8 to 12 weight percent aluminum, 15 to 26 wt % nickel, 5 to 24 wt % cobalt, up to 6 wt % copper, up to 1% titanium, wherein the balance of material to add up to 100 wt % is iron. In some other embodiments, a magnetizable coating can be deposited on an abrasive particle 100 using a vapor deposition technique such as, for example, physical vapor deposition (PVD) including magnetron sputtering.

Including these magnetizable materials can allow shaped abrasive particle to be responsive a magnetic field. Any of shaped abrasive particles can include the same material or include different materials.

The magnetic coating may be a continuous coating, for example that coats an entire abrasive particle, or at least coats an entire surface of an abrasive particle. In another embodiment, a continuous coating refers to a coating present with no uncoated portions on the coated surface. In one embodiment, the coating is a unitary coating—formed of a single layer of magnetic material and not as discrete magnetic particulates. In one embodiment, the magnetic coating is provided on an abrasive particle while the particle is still in a mold cavity, such that the magnetic coating directly contacts an abrasive particle precursor surface. In one embodiment, the thickness of the magnetic coating is at most equal to, or preferably less than, a thickness of the abrasive particle. In one embodiment, the magnetic coating is not more than about 20 wt. % of the final particle, or not more than about 10 wt. % of the final particle, or not more than 5 wt. % of the final particle.

In block 830, the particles are placed with respect to each other on a backing. Aligning the abrasive particles with respect to each other generally requires two steps. First, providing the magnetizable abrasive particles described herein on a substrate having a major surface. Second, applying a magnetic field to the magnetizable abrasive particles such that a majority of the magnetizable abrasive particles are oriented substantially perpendicular to the major surface.

Without application of a magnetic field, the resultant magnetizable abrasive particles may not have a magnetic moment, and the constituent abrasive particles, or magnetizable abrasive particles may be randomly oriented. However, when a sufficient magnetic field is applied the magnetizable abrasive particles will tend to align with the magnetic field. In favored embodiments, the ceramic particles have a major axis (e.g. aspect ratio of 2) and the major axis aligns parallel to the magnetic field. Preferably, a majority or even all of the magnetizable abrasive particles will have magnetic moments that are aligned substantially parallel to one another. As described above, abrasive particles described herein may have more than one magnetic moments, and will align with a net magnetic torque.

The magnetic field can be supplied by any external magnet (e.g., a permanent magnet or an electromagnet) or set of magnets. In some embodiments, the magnetic field typically ranges from 0.5 to 1.5 kOe. Preferably, the magnetic field is substantially uniform on the scale of individual magnetizable abrasive particles.

For production of abrasive articles, a magnetic field can optionally be used to place and/or orient the magnetizable abrasive particles prior to curing a binder (e.g., vitreous or organic) precursor to produce the abrasive article. The magnetic field may be substantially uniform over the magnetizable abrasive particles before they are fixed in position in the binder or continuous over the entire, or it may be uneven, or even effectively separated into discrete sections. Typically, the orientation of the magnetic field is configured to achieve alignment of the magnetizable abrasive particles according to a predetermined orientation.

As a result of this process, individual shaped abrasive particles are positioned on a backing such that abrasive particles are parallel to each other and have cutting faces facing in a downweb direction.

Examples of magnetic field configurations and apparatuses for generating them are described in U.S. Pat. No. 8,262,758 (Gao) and U.S. Pat. No. 2,370,636 (Carlton), U.S. Pat. No. 2,857,879 (Johnson), U.S. Pat. No. 3,625,666 (James), U.S. Pat. No. 4,008,055 (Phaal), U.S. Pat. No. 5,181,939 (Neff), and British (G. B.) Pat. No. 1 477 767 (Edenville Engineering Works Limited).

In block 840, the particles are adhered to a backing. Any abrasive article such as abrasive belt or abrasive disc can include a make coat to adhere shaped abrasive particles, or a blend of shaped abrasive particles and crushed abrasive particles, to backing.

FIG. 8 illustrates block 430 and 440 as two separate steps. However, it is expressly contemplated that, in some embodiments, placement and alignment occur simultaneously, for example by exposing particles to a magnetic field during placement.

In block 850, additional coatings are applied, such as a size coating or a supersize coating. The abrasive article may further include a size coat adhering the shaped abrasive particles to the make coat. The make coat, size coat, or both can include any suitable resin such as a phenolic resin, an epoxy resin, a urea-formaldehyde resin, an acrylate resin, an aminoplast resin, a melamine resin, an acrylated epoxy resin, a urethane resin, or mixtures thereof. Additionally, the make coat, size coat, or both can include a filler, a grinding aid, a wetting agent, a surfactant, a dye, a pigment, a coupling agent, an adhesion promoter, or a mixture thereof. Examples of fillers may include calcium carbonate, silica, talc, clay, calcium metasilicate, dolomite, aluminum sulfate, or a mixture thereof. In some embodiments, a curing step is needed between applications of coating layers. For example, the make coat may be at least partially cured before the size coat is applied.

Figure 9:
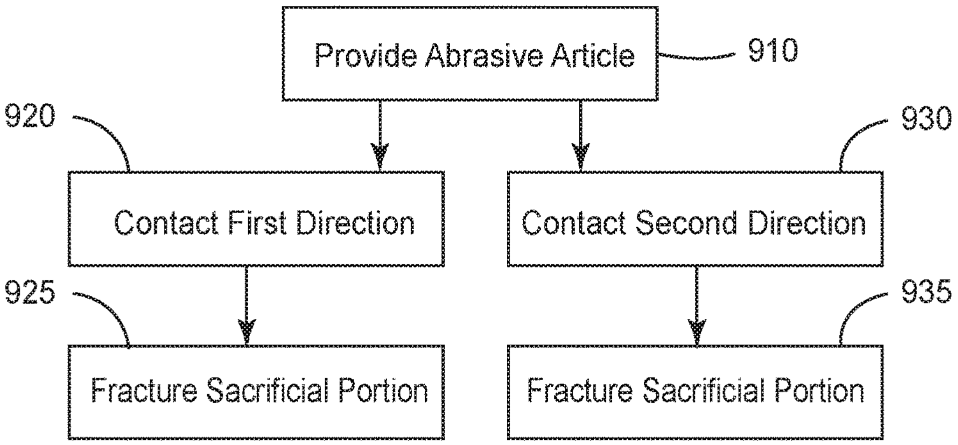
FIG. 9 illustrates a method of using a coated abrasive article in accordance with an embodiment of the present invention.

FIG. 9 illustrates a method of using an abrasive article in accordance with an embodiment of the present invention. Method 910 can be used to abrade a number of different workpieces. Upon contact, one of the abrasive article and the workpiece is moved relative to one another in a direction of use and a portion of the workpiece is removed.

Examples of workpiece materials include metal, metal alloys, steel, steel alloys, aluminum exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts, crankshafts, furniture, and turbine blades.

Abrasive articles according to the present disclosure are useful for abrading a workpiece. Methods of abrading range from snagging (i.e., high pressure high stock removal) to polishing (e.g., polishing medical implants with coated abrasive belts), wherein the latter is typically done with finer grades of abrasive particles. One such method includes the step of frictionally contacting an abrasive article (e.g., a coated abrasive article, a nonwoven abrasive article, or a bonded abrasive article) with a surface of the workpiece, and moving at least one of the abrasive article or the workpiece relative to the other to abrade at least a portion of the surface.

In block 910, an abrasive article is provided. In one embodiment, the abrasive article includes a plurality of abrasive particles that are designed with a first direction of use and a second direction of use. For example, referring back to FIG. 1, moving an abrasive article in a first direction of use refers to moving an abrasive article such that a cutting face 130 encounters an workpiece first. A second direction of use refers to moving an abrasive article in an opposite direction. According to various embodiments, a method of using an abrasive article such as abrasive belt or abrasive disc includes contacting shaped abrasive particles with a workpiece or substrate.

According to various embodiments, a cutting depth into the substrate or workpiece can be at least 1 μm about 10 μm, at least about 20 μm, at least about 30 μm, at least about 40 μm, at least about 50 μm, or at least about 60 μm. The cutting depth may depend, in part, on the size of the abrasive particles. For example, smaller particles may have an even smaller cutting depth, such as less than 1 μm, or less than 0.5 μm, or less than 0.1 μm. A portion of the substrate or workpiece is removed by the abrasive article as a swarf.

According to various embodiments, the abrasive articles described herein can have several advantages when moved in a preferred direction of use. For example, at the same applied force, cutting speed, or a combination thereof, an amount of material removed from the workpiece, length of a swarf removed from the workpiece, depth of cut in the workpiece, surface roughness of the workpiece or a combination thereof is greater in the first direction than in any other second direction.

For example, at least about 10% more material is removed from the substrate or workpiece in the first direction of use, or at least about 15%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 100%, at least about 120%, at least about 130%, at least about 140%, at least about 150%. In some embodiments, about 15% to about 500% more material is removed in the first direction of use, or about 30% to about 70%, or about 40% to about 60%, or less than, equal to, or greater than about 15%, 20%, 25%, 30%, 35%, 40%, 45%, 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180%, 185%, 190%, 195%, 200%, 205%, 210%, 215%, 220%, 225%, 230%, 235%, 240%, 245%, 250%, 255%, 260%, 265%, 270%, 275%, 280%, 285%, 290%, 295%, 300%, 305%, 310%, 315%, 320%, 325%, 330%, 335%, 340%, 345%, 350%, 355%, 360%, 365%, 370%, 375%, 380%, 385%, 390%, 395%, 400%, 405%, 410%, 415%, 420%, 425%, 430%, 435%, 440%, 445%, 450%, 455%, 460%, 465%, 470%, 475%, 480%, 485%, 490%, 495%, or about 500%. The amount of material removed can be in reference to an initial cut (e.g., the first cut of a cutting cycle) or a total cut (e.g., a sum of the amount of material removed over a set number of cutting cycles).

As a further example, a depth of cut into the substrate or workpiece may be at least about 10% deeper in the first direction of use, or at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 100%, at least about 120%, at least about 130%, at least about 140%, at least about 150%. In some embodiments, about 10% to about 500% deeper in the first direction of use, or about 30% to about 70%, or about 40% to about 60%, or less than, equal to, or greater than about 15%, 20%, 25%, 30%, 35%, 40%, 45%, 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180%, 185%, 190%, 195%, 200%, 205%, 210%, 215%, 220%, 225%, 230%, 235%, 240%, 245%, 250%, 255%, 260%, 265%, 270%, 275%, 280%, 285%, 290%, 295%, 300%, 305%, 310%, 315%, 320%, 325%, 330%, 335%, 340%, 345%, 350%, 355%, 360%, 365%, 370%, 375%, 380%, 385%, 390%, 395%, 400%, 405%, 410%, 415%, 420%, 425%, 430%, 435%, 440%, 445%, 450%, 455%, 460%, 465%, 470%, 475%, 480%, 485%, 490%, 495%, or about 500%.

As a further example an arithmetical mean roughness value (Sa) of the workpiece or substrate cut by moving the abrasive article in first direction of use 202 or 304 can be higher than a corresponding substrate or workpiece cut under the exact same conditions but in the second direction of movement. For example, the surface roughness can be about 30% greater when the workpiece or substrate is cut in the first direction or about 40% greater, about 50% greater, about 60% greater, about 70% greater, about 80% greater, about 90% greater, about 100% greater, about 110% greater, about 120% greater, about 130% greater, about 140% greater, about 150% greater, about 160% greater, about 170% greater, about 180% greater, about 190% greater, about 200% greater, about 210% greater, about 220% greater, about 230% greater, about 240% greater, about 250% greater, about 260% greater, about 270% greater, about 280% greater, about 290% greater, about 300% greater, about 310% greater, about 320% greater, about 330% greater, about 340% greater, about 350% greater, about 360% greater, about 370% greater, about 380% greater, about 390% greater, about 400% greater, about 410% greater, about 420% greater, about 430% greater, about 440% greater, about 450% greater, about 460% greater, about 470% greater, about 480% greater, about 490% greater, or about 500% greater. The arithmetical mean roughness value can be in a range of from about 1000 to about 2000, about 1000 to about 1100, or less than, equal to, or greater than about 1000, 1050, 1100, 1150, 1200, 1250, 1300, 1350, 1400, 1450, 1500, 1550, 1600, 1650, 1700, 1750, 1800, 1850, 1900, 1950, or about 2000.

Alternatively, as illustrated in block 930, it is possible for the abrasive article to be moved in a second direction that is different than the first direction of use. The second direction can be in a direction rotated about 1 degree to 360 degrees relative to the first direction of use, about 160 degrees to about 200 degrees, less than, equal to, or greater than about 1 degree, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 230, 240, 250, 260, 265, 270, 275, 280, 285, 290, 295, 300, 305, 310, 315, 320, 325, 330, 335, 340, 350, 355, or about 360 degrees.

Although it may be desirable to move the abrasive article in first direction of use, there are some reasons to move the abrasive article in a second direction of movement other than first direction of use. For example, contacting the substrate or workpiece with the abrasive article and moving the abrasive article in the second direction may be beneficial for finishing the substrate or workpiece. While not intending to be bound to any particular theory, the inventors hypothesize that movement in the second direction may expose the substrate or workpiece to an angle other than a rake angle of the abrasive particle, which is more suited for finishing applications.

In some embodiments, shaped abrasive particles described herein can be included in a random orbital sander or vibratory sander. In these embodiments, it may be desirable to have shaped abrasive particles be randomly oriented (e.g., have different or random z-direction rotational angles). This is because the direction of use of such an abrasive article is variable. Therefore, randomly orienting shaped abrasive particles can help to expose cutting faces of suitable amount of shaped abrasive particles to workpiece regardless of the specific direction of use of the random orbital sander or vibratory sander.

Shaped abrasive particles such as those described herein can account for 100 wt % of the abrasive particles in any abrasive article. Alternatively, shaped abrasive particles can be part of a blend of abrasive particles distributed on backing. If present as part of a blend, shaped abrasive particles may be in a range of from about 5 wt % to about 95 wt % of the blend, about 10 wt % to about 80 wt %, about 30 wt % to about 50 wt %, or less than, equal to, or greater than about, 5 wt %, 10, 15, 20, 25, 30, 35, 40, 45, 50, 55, 60, 65, 70, 75, 80, 85, 90, or about 95 wt %, of the blend. In the blend, the balance of the abrasive particles may include conventional crushed abrasive particles. Crushed abrasive particles are generally formed through a mechanical crushing operation and have no replicated shape. The balance of the abrasive particles can also include other shaped abrasive particles, that may for example, include an equilateral triangular shape (e.g., a flat triangular shaped abrasive particle or a tetrahedral shaped abrasive particle in which each major face of the tetrahedron is an equilateral triangle).

FIGS. 10A-10D show embodiments in which an abrasive article is an abrasive belt or an abrasive sheet adapted for linear movement. In other embodiments, however, the abrasive article can be an abrasive disc that is adapted for rotational movement. The tangential rotational direction of use for an abrasive disc can be determined with a line tangent to an outer perimeter of the abrasive disc.

Figure 10A:
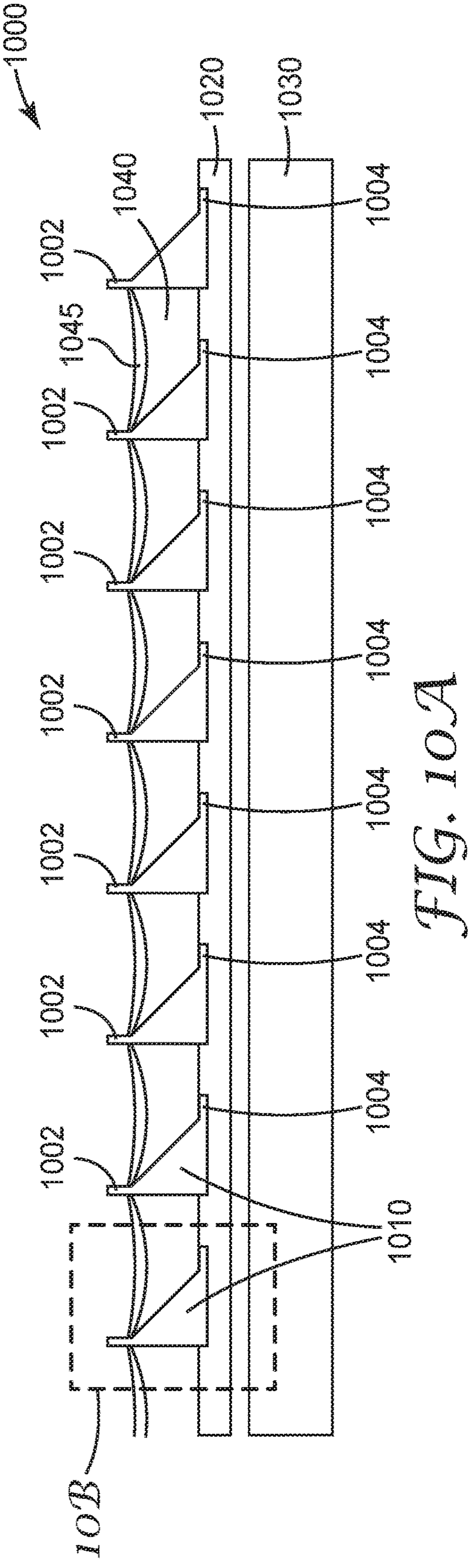
FIGS. 10A-10D illustrate abrasive particles as part of abrasive articles.
Figure 10B:
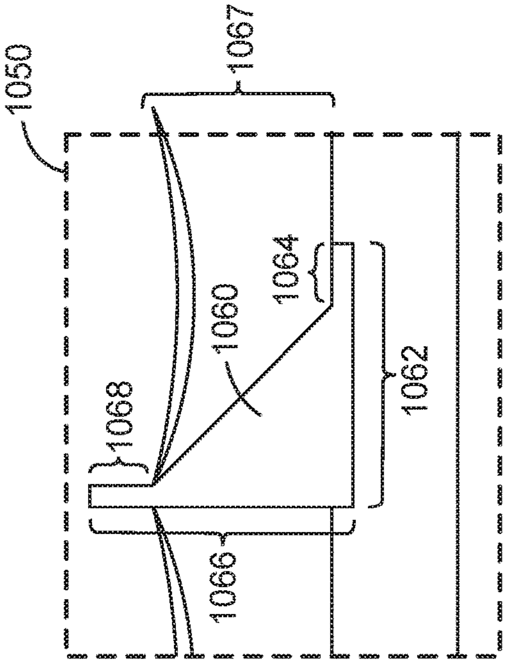

FIG. 10A illustrates an abrasive article 1000 with a plurality of abrasive particles 1010 embedded within a make layer 1030 on a backing 1020. A size layer 1040 and an optional supersize layer 1045 may also be added. In some embodiments, as illustrated in the close up view of FIG. 10B, a sacrificial portion 1068 may extend beyond a coating layer 1067, which may consist of size layer 1040 and/or supersize layer 1045. However, while FIG. 10B illustrates sacrificial portion 1068 as uncovered from the supersize 1045 and size layer 1040. However, it is expressly contemplated that, in some embodiments, size coating 1040 and/or supersize coating 1045 may cover the sacrificial portion 1068 of edge 1066.

FIG. 10B illustrates a close-up view of a single particle 1060 embedded coupled to a backing, with a coating layer 1067 applied over a make coat layer, with sacrificial portion 1068 extending substantially above coating layer 1067. As illustrated in FIG. 10B, a second sacrificial portion 1064 may extend beyond a base edge 1062, which is embedded within a make coat layer.

Figure 10C:
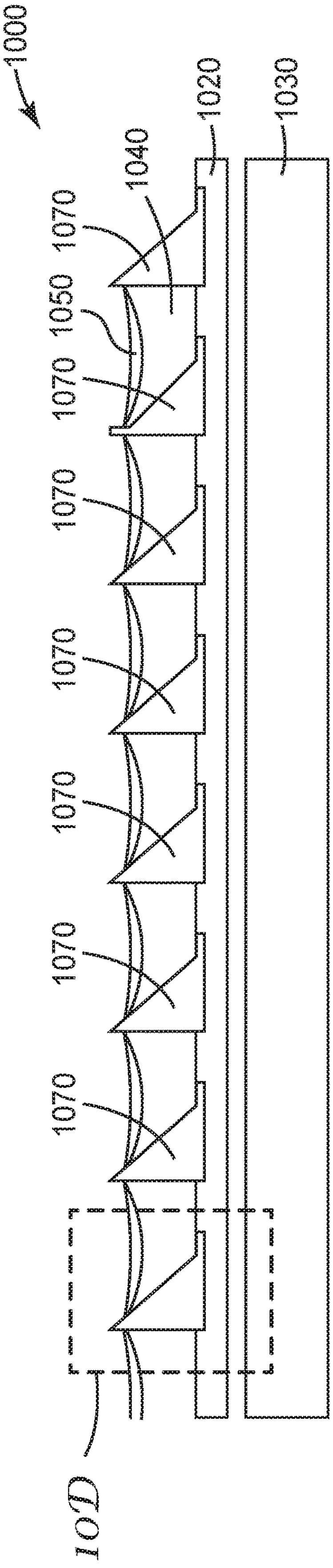
Figure 10D:
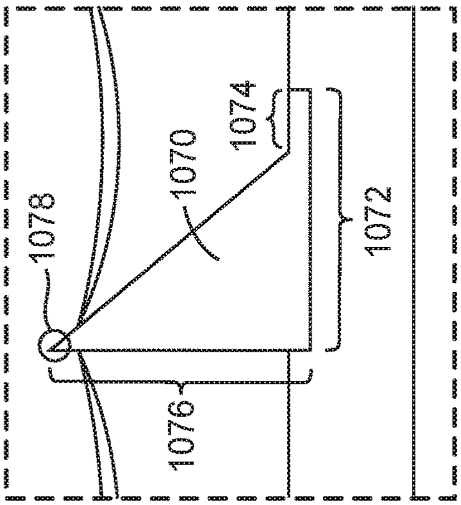

FIGS. 10C and 10D illustrate abrasive article 1000 after initial contact with a workpiece. As illustrated in FIG. 10C, a plurality of particles 1070 are still coupled to backing 1020 through make coat 1030. Second sacrificial portion 1074 is still embedded within make layer 1030*m* in some embodiments.

As illustrated in FIG. 10D, a sharp edge 1078 is created by the fracturing off of sacrificial portion 1068. Sharp edge 1078 may have a sharp tip that has a smaller radius of curvature that can be obtained using traditional molding processes. Fractured particle has a height 1076.

Figure 11:
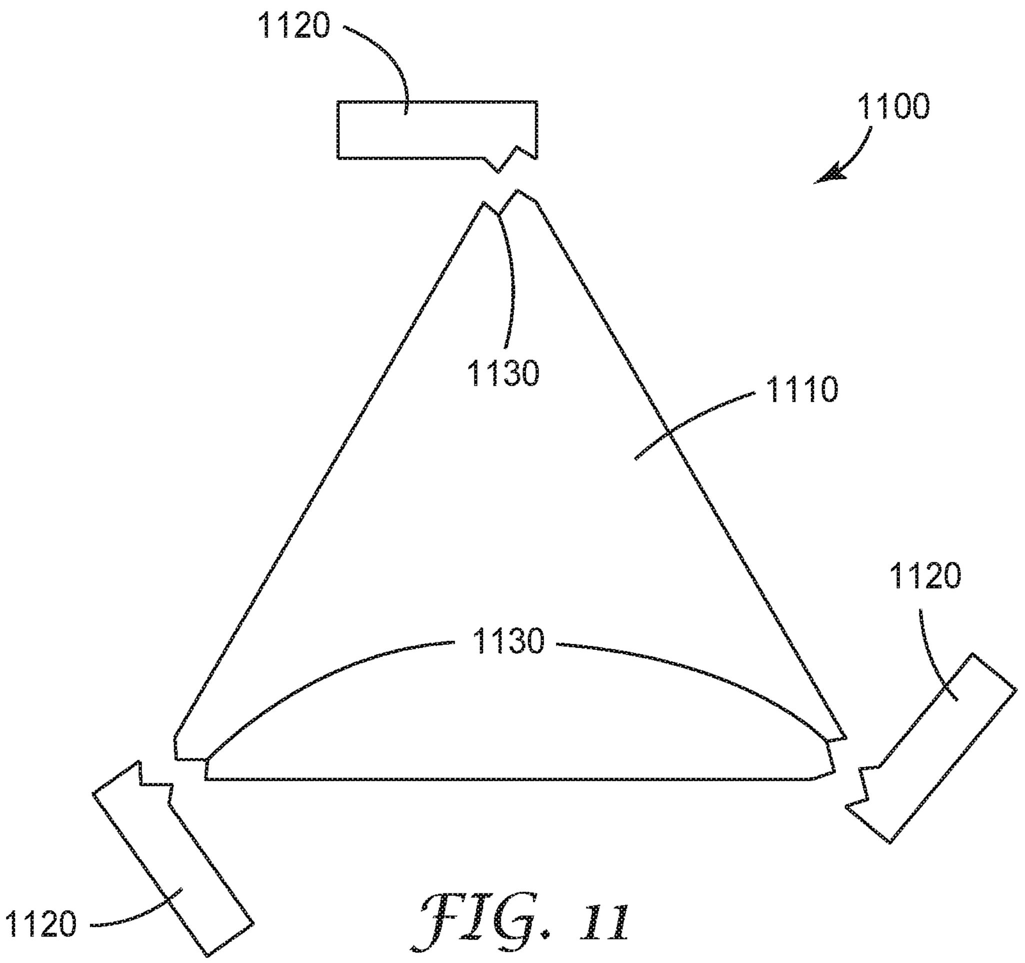
FIG. 11 illustrates a fractured abrasive particle according to embodiments of the present invention.

FIG. 11 illustrates a fractured abrasive particle according to embodiments of the present invention. Particle 1100 is illustrated as having a general triangular shape 1110, however it is understood that the concept extends to other suitable shapes. The general triangular shape 1110 is imparted to particle 1100 through a molding process, as described below with respect to FIGS. 12-13.

Particle 1100 has one or more fractured portions 1120 that break away from particle 1100 during an initial drying step in a mold, or during firing or sintering due to a heightened stress on the particle 1100. As described herein, particle 1100 can be formed from a sol-gel, a slurry, or another suitable method. Abrasive particles are made from a variety of methods that require at least an initial drying step before being removed from a mold. During the drying step, some shrinkage occurs. Particle 1100 is formed such that, at one or more fracture points 1130, the strain from the shrinking caused during drying causes fracturing at the fracture point, resulting in fractured portions 1120. Fractured portions 1120, as illustrated in FIG. 11, represent a small volume of the triangular shape 1110 of particle 1100. For example, in one embodiment, less than about 15% of a hypothetical polygonal shape is lost to fracturing, or less than about 10%, or less than about 5%.

Figure 12A:
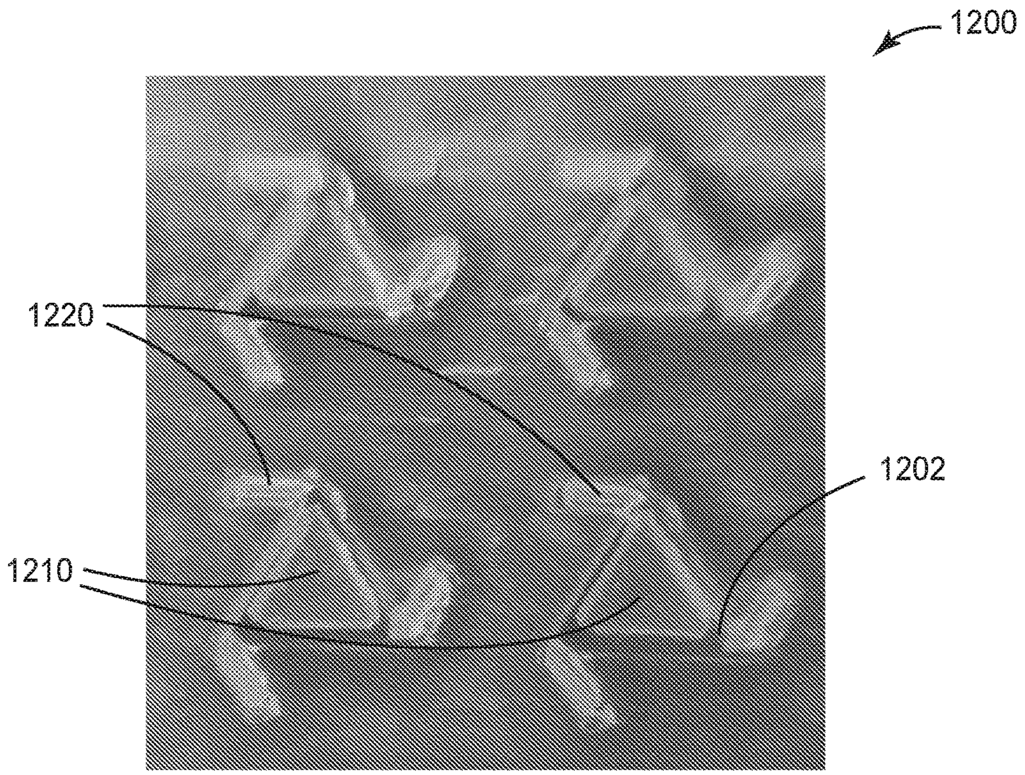
FIGS. 12A and 12B illustrates a mold for fracturing abrasive particles according to embodiments of the present invention.
Figure 12B:
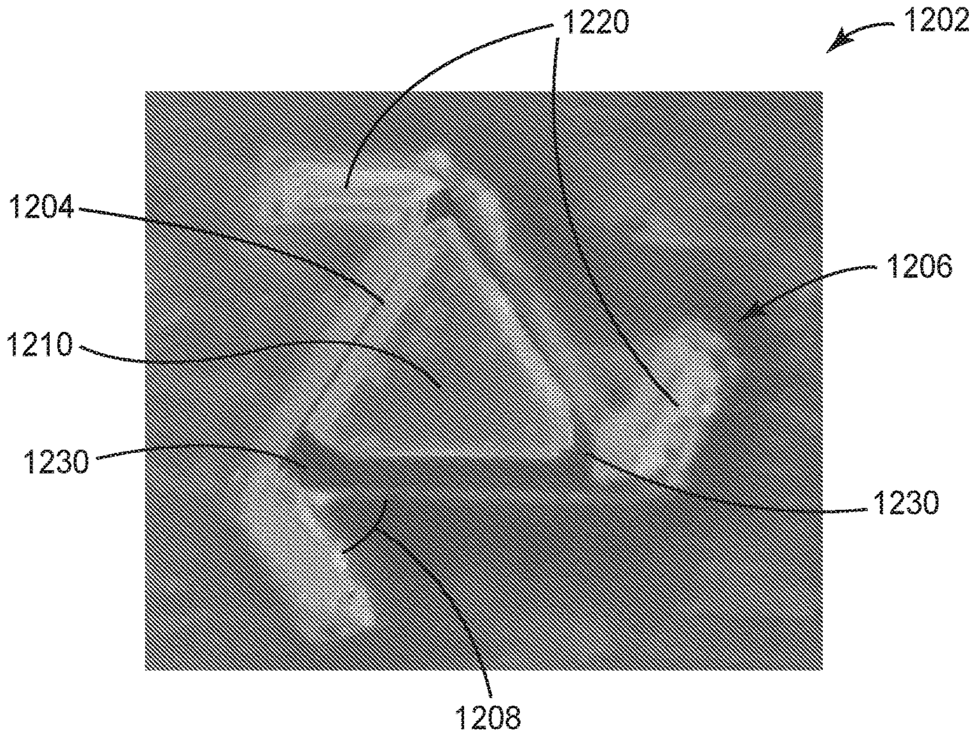

FIGS. 12A and 12B illustrate a mold for fracturing abrasive particles according to embodiments of the present invention. Mold 1200 illustrates a plurality of cavities after an initial drying process where particles 1210 have fractured along fracture points, causing fractured portions 1220 to break off. As illustrated in FIG. 12, mold 1200 includes cavity shapes 1202 with a general triangular shape 1204 and one or more fracture cavity portions 1206. During drying, the abrasive particle material shrinks and pulls away from the edges of the cavity. Fracture cavity portions 1206 are designed such that the fracture portions of the particle cannot recede inward with shape portion 1204, resulting in breakage at a fracture point 1230. As illustrated in FIGS. 12A and 12B, fracture points 1230 can be created within a mold cavity 1202 by angling a fracture portion away from a particle shape portion. The angle must be big enough to hinder shrinkage and cause breakage instead. An acute angle 1208 with respect to particle shape portion 1204 is sufficient, however a right angle or an obtuse angle may also be sufficient, depending on drying conditions, solution components and concentration, and shape portion 1204. Additionally, the fracture portions 1230 may be curved, as illustrated in FIG. 7E, for example, or simply tapered, as illustrated in FIG. 7C.

Fracture portions 1206 are illustrated as a bar shape extending from a corner of shape portion 1204. However other shapes, and other positions, may also be suitable. In the context of triangular shaped abrasive particles, however, the presence of fracturing at each of the three vertices ensures a sharp edge available on an abrasive article with the opposing edge still available to form a stable base for embedding within a make coat layer of an abrasive article.

Figure 13:
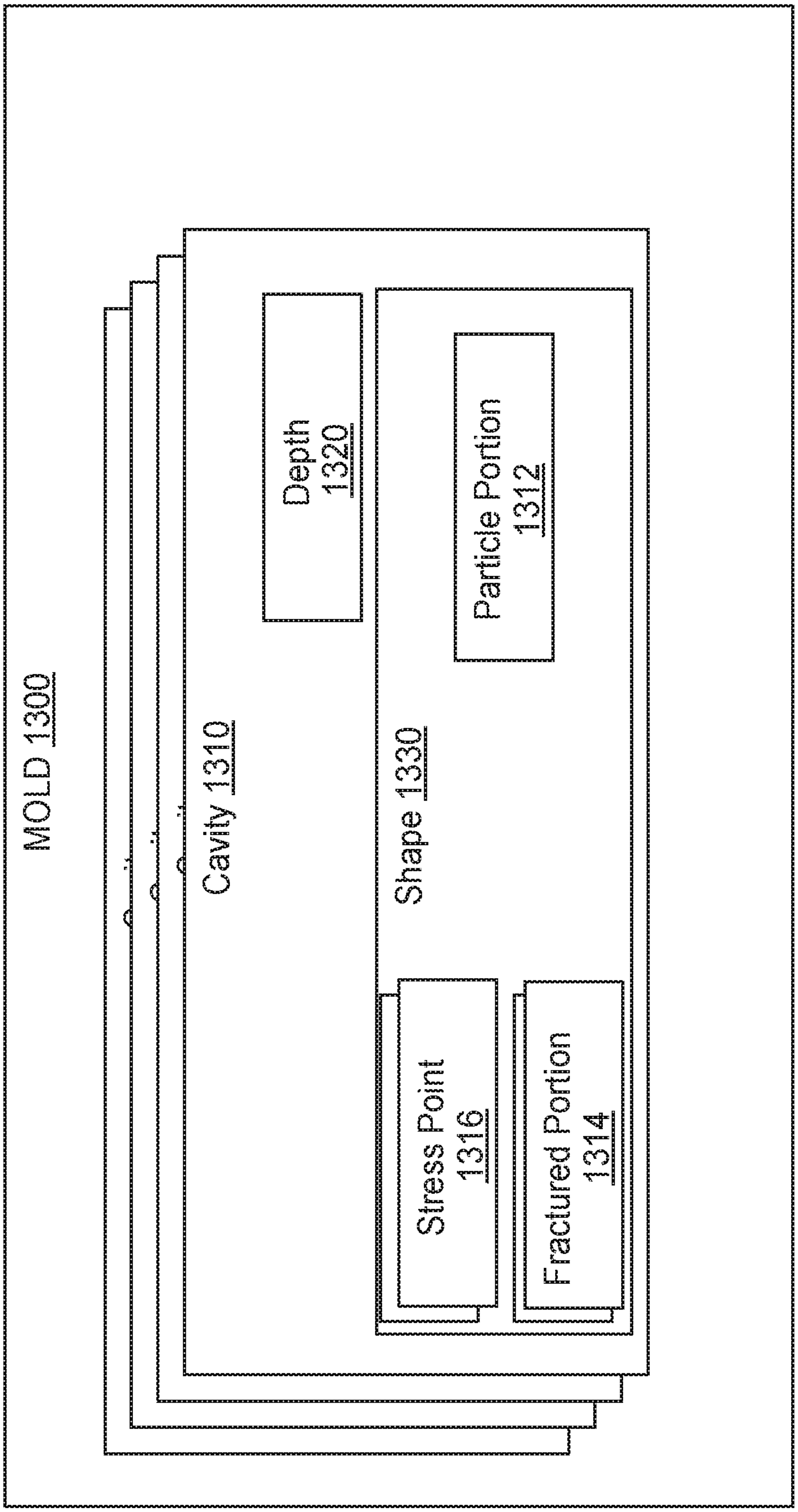
FIG. 13 illustrates components of a fractured shaped abrasive particle according to embodiments of the present invention.

FIG. 13 illustrates components of a fractured shaped abrasive particle according to embodiments of the present invention. A mold 1300 includes a plurality of cavities 1310. Each cavity 1310 includes a depth 1320, which may be constant or variable. For example, fracture portions 1314 may be deeper or shallower in order to encourage fracturing during drying. Cavities 1310 may also include a textured surface, either along the sides or along the bottom, such that the textured surface is imparted to an abrasive particle.

Each of the cavities 1310 may also include a shape 1330, imparted to a produced abrasive particle. Shape 1330 includes a particle portion 1312, which may have a polygonal or other purposely selected shape, as well as one or more fractured portions 1314 which are designed to break away from particle portion 1312, at or near a stress point 1316, during drying, firing or sintering.

Figure 14:
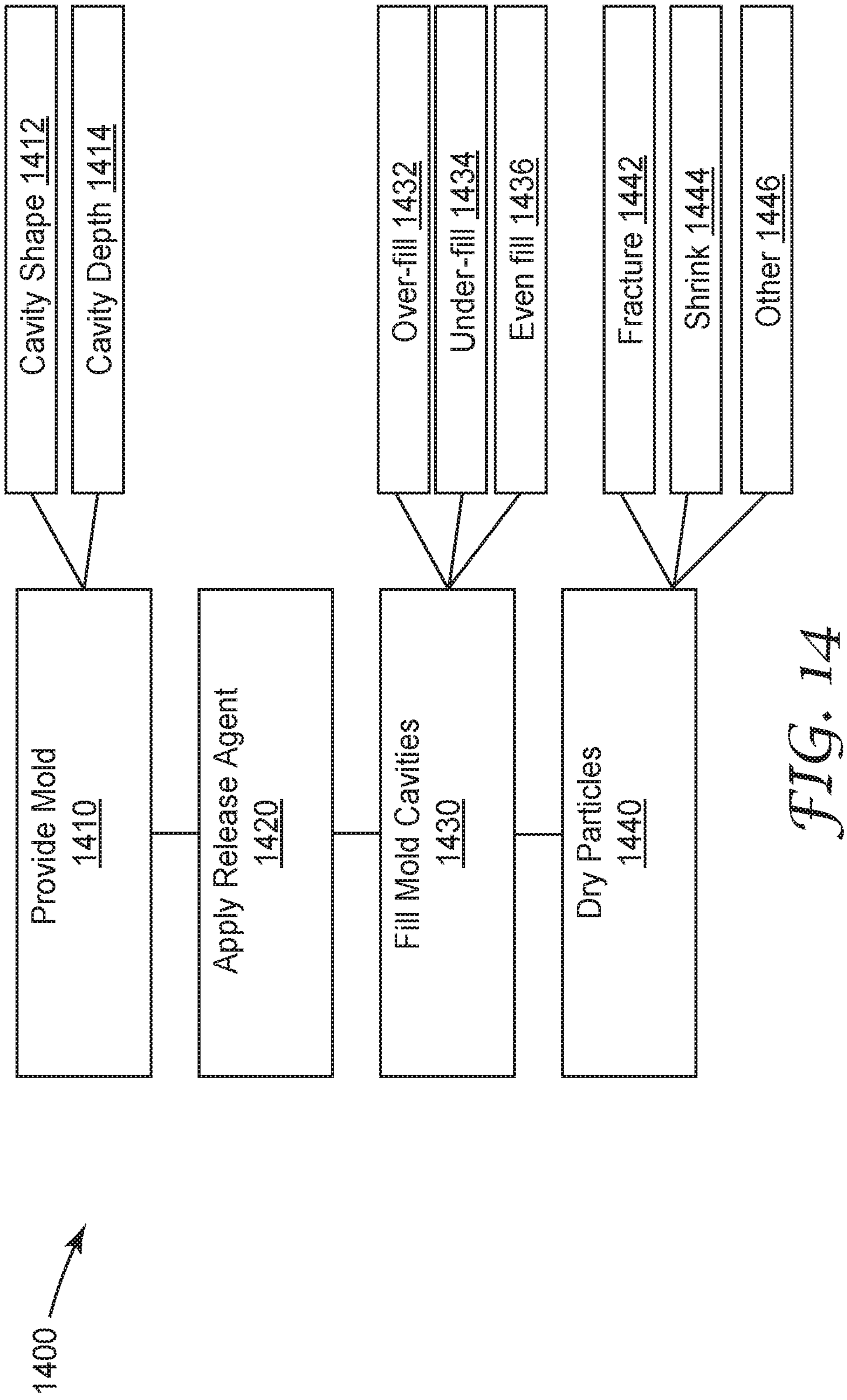
FIG. 14 illustrates a method of making fractured abrasive particles according to embodiments of the present invention.

FIG. 14 illustrates a method of making fractured abrasive particles according to embodiments of the present invention. Method 1400 may be utilized with molds such as those of FIG. 12 or 13, or any other suitable molding process.

In block 1410, a mold is provided. The mold includes at least one cavity with a shape 1412. Shape 1412 may be designed to produce any suitable shaped abrasive particle. For example, a suitable shape may include any polygonal shape including regular polygons, irregular polygons, shapes with curved edges such as convex or concave portions, or may have straight shapes. Shape 1412 may also one or more fracture portions designed to break off during manufacture. Fracture portions may be located at a vertex of the suitable shape or along an edge of the suitable shape. The cavity may also have a depth 1414, which may be constant or variable over the area of the cavity. For example, the cavity may have a first depth for the suitable shape portion and a second depth for the fracture portions.

In block 1420, a release agent is applied to the mold. The release agent may be applied to the entire interior surface of each cavity. The release agent may facilitate shrinking during a drying period, as well as removal of a resulting abrasive particle from the cavity. For aqueous solutions of abrasive particle precursor, the release agent may include an oil.

In block 1430, the mold cavities are filled with abrasive particle precursor. The cavities may be overfilled 1432, underfilled 1434, or evenly filled 1436.

In block 1440, the particles are dried during an initial drying step while the particle precursor is still in the mold cavity. While further processing may be required to finish the abrasive particles, an initial drying step may occur in the mold. Drying in the mold may cause fracturing 1442 of fracture portions. Drying may also cause shrinkage 1444 of the shape of the abrasive particles. Drying may also have other effects, such as settling or separating of layers, or curing of the abrasive particle mixture.

Figure 15A:
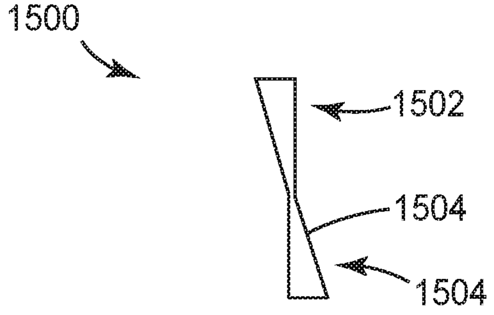
FIGS. 15A-D illustrate additional shapes of abrasive particles in accordance with embodiments herein.
Figure 15B:
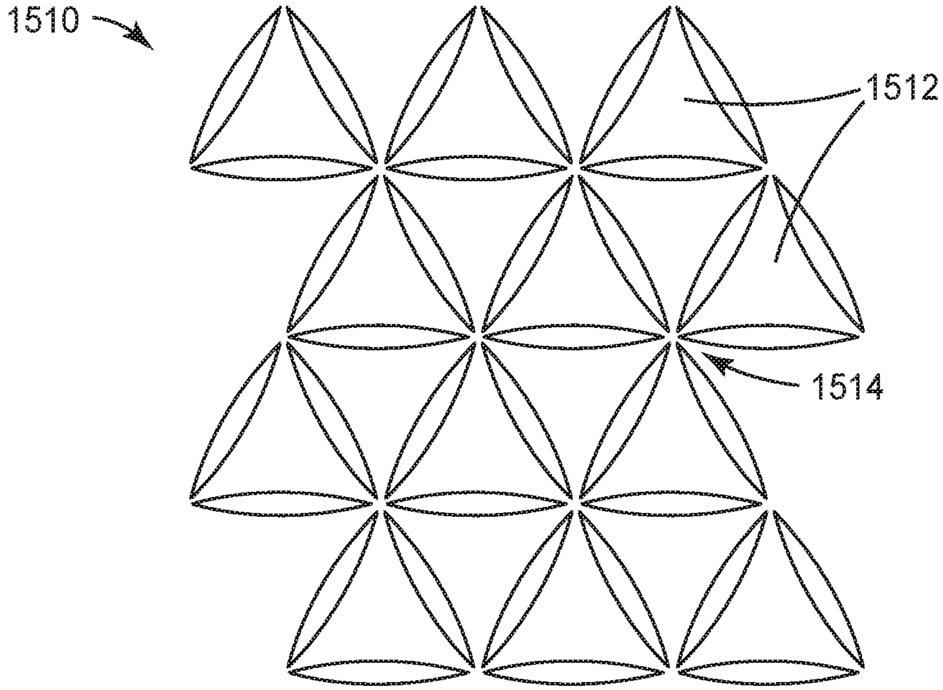

FIGS. 15A-D illustrate additional shapes of abrasive particles in accordance with embodiments herein. Much of the description herein concerns the example embodiment where a resulting abrasive particle has a triangular, or substantially triangular shape. However, other shapes are expressly contemplated. FIGS. 15A-B illustrate some example shapes.

FIGS. 15A and 15B illustrate shapes where a separate fractured, or sacrificial, portion may not be formed during a fracturing step. Instead, fracturing releases each abrasive particle. For example, FIG. 15A illustrates a particle 1500 with a first portion 1502 and a second portion 1504, which may, during a fracturing step that occurs during a drying step, break into two separate abrasive particles, each of which may become part of an eventual abrasive article.

FIG. 15B illustrates a plurality of abrasive particles 1512 connected at fracture points 1514 that may be made from a single mold with shape 1510. A mold like 1510 may cause fracturing of particles 1512 from each other during drying or during a removal step due to the fragile connection between particles at stress points 1514.

Figure 15C:
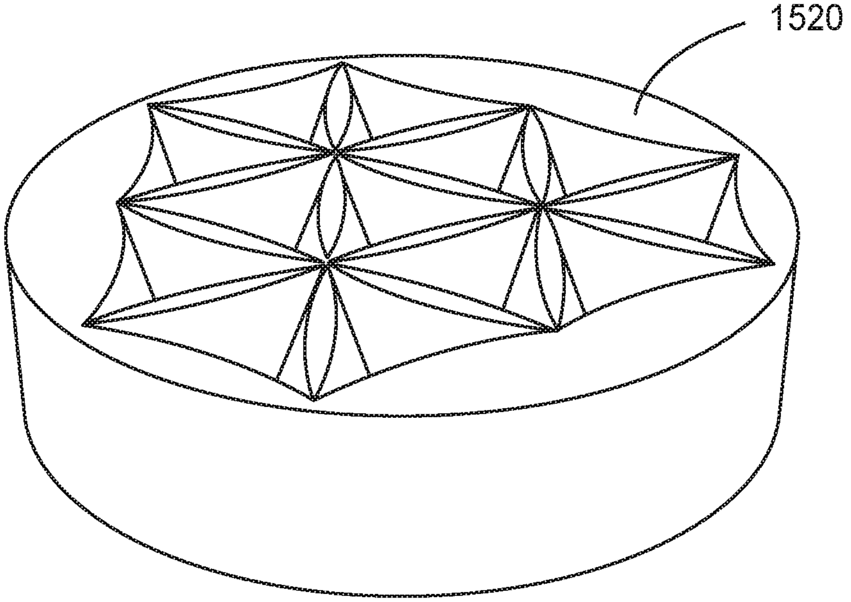
Figure 15D:
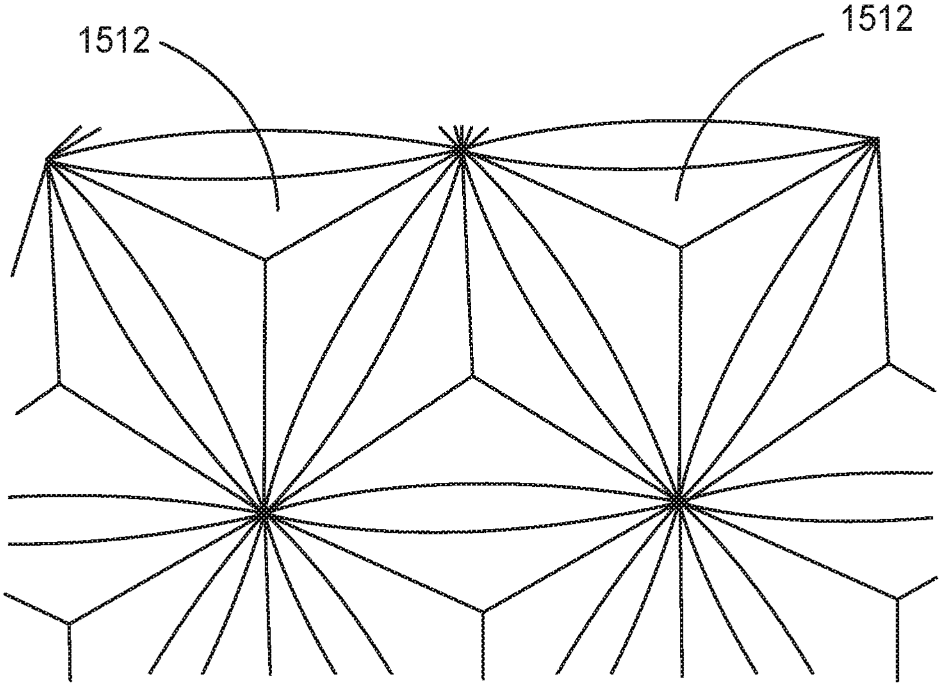

FIG. 15C illustrates a mold 1520 that may be used to make the particles 1512. A 3D representation of particles 512 is illustrated in FIG. 15D. According to various embodiments, a cutting speed of the abrasive article can be at least about 100 m/min, at least about 110 m/min, at least about 120 m/min, at least about 130 m/min, at least about 140 m/min, at least about 150 m/min, at least about 160 m/min at least about 170 m/min, at least about 180 m/min, at least about 190 m/min, at least about 200 m/min, at least about 300 m/min, at least about 400 m/min, at least about 500 m/min, at least about 1000 m/min, at least about 1500 m/min, at least about 2000 m/min, at least about 2500 m/min, at least about 3000 m/min, or at least about 4000 m/min.

Abrasive articles according to the present disclosure may be used by hand and/or used in combination with a machine. At least one of the abrasive article and the workpiece is moved relative to the other when abrading. Abrading may be conducted under wet or dry conditions. Exemplary liquids for wet abrading include water, water containing conventional rust inhibiting compounds, lubricant, oil, soap, and cutting fluid. The liquid may also contain defoamers, degreasers, for example.

While many embodiments discussed herein have discussed the fracture portion generated during manufacturing may also be used for abrasive products. The fracture portions may provide some of the same benefits of shaped abrasive particles at a smaller size.

A mold for making abrasive particles that includes a surface and a plurality of cavities extending downward from the surface. Each cavity includes a particle shape portion comprising a polygonal shape, and a fracture portion coupled to the particle shape portion. The fracture portion is configured to break from the particle shape portion during a stress event, resulting in a fractured shape abrasive particle.

The mold may be implemented such that the fracture portion includes a fracture shape.

The mold may be implemented such that the fracture shape extends from an edge of the polygonal shape.

The mold may be implemented such that the fracture shape extends from a corner of the polygonal shape.

The mold may be implemented such that the fracture shape extends further into the surface than the particle shape portion.

The mold may be implemented such that the fracture shape is angled with respect to an edge of the polygonal shape.

The mold may be implemented such that the angle is an acute angle.

The mold may be implemented such that the angle is a right angle.

The mold may be implemented such that the angle is an obtuse angle.

The mold may be implemented such that the fracture portion is a second particle shape portion.

The mold may be implemented such that the fractured shape is at least about 90% similar to the polygonal shape.

The mold may be implemented such that the stress event is a drying phase that occurs while an abrasive particle precursor is in the mold.

The mold may be implemented such that the stress event is a first abrasive operation.

The mold may be implemented such that the stress event is a firing event.

The mold may be implemented such that the stress event is a sintering step.

The mold may be implemented such that the stress event is a cooling step.

A shaped abrasive particle is presented that includes a first face and a second face. The first face is substantially parallel to the second face, separated by a thickness of the shaped abrasive particle. The first face includes a first molded edge and a second molded edge and a fractured vertex at the intersection of the first and second molded edges. The fractured vertex has a first radius of curvature that is smaller than a second radius of curvature associated with the first edge.

The shaped abrasive particle may be implemented such that the first and second faces are substantially triangular in shape. The fractured vertex is at a first corner of the substantially triangular shape.

The shaped abrasive particle may be implemented such that the substantially triangular shape includes a second fractured vertex, at a second corner.

The shaped abrasive particle may be implemented such that the substantially triangular shape includes a third fractured vertex, at a third corner.

The shaped abrasive particle may be implemented such that the fractured vertex is formed at a fracture point of a shaped abrasive particle precursor. A fracture occurs at the fracture point during a stress event. The stress event is selected from the group consisting of: drying, cooling, firing, sintering, abrasive article manufacture, and initial contact with a workpiece.

The shaped abrasive particle may be implemented such that the fractured vertex has a lower radius of curvature than a pre-fracture vertex of the shaped abrasive particle precursor.

A method of manufacturing an abrasive particle is presented. The method includes filling a mold cavity with an abrasive particle precursor mixture. The mold cavity includes a particle shape portion, a fracture portion, extending from the particle shape portion. The particle shape portion and the fracture portion are coupled together at a stress point. The method also includes drying the abrasive particle precursor mixture in the mold cavity to form an abrasive particle precursor. Drying causes the fracture portion to break from the particle shape portion near the stress point.

The method may be implemented such that the particle shape portion includes a regular polygon.

The method may be implemented such that the particle shape portion includes an irregular polygon.

The method may be implemented such that the fracture portion extends from the particle shape portion along an edge of the particle shape portion.

The method may be implemented such that the fracture portion includes a second particle shape.

The method may be implemented such that the fracture portion extends from the particle shape portion at a corner of the particle shape portion.

The method may be implemented such that the fracture portion extends from a face of the particle shape portion.

The method may be implemented such that the particle shape portion includes a first face and a second face. The first face is parallel to the second face.

The method may be implemented such that the mold cavity has a depth.

The method may be implemented such that the depth is a variable depth.

The method may be implemented such that the fracture portion is a first fracture portion extending from a first point of the particle shape portion, and further comprising a second fracture portion extending from the particle shape portion at a second point of the particle shape portion.

The method may be implemented such that after drying, the abrasive particle precursor has a particle shape that is about 90% similar to the particle shape portion of the cavity.

The method may be implemented such that the force required to fracture the fracture portion from the particle shape portion is less than 50% of the force to fracture a the particle portion to a half height of the particle portion.

A method of making an abrasive article is presented that includes providing a plurality of abrasive particles. The plurality of abrasive particles are formed by filling a plurality of mold cavities with an abrasive particle precursor mixture. Each of the plurality of mold cavities includes a particle portion and a fracture portion. Forming the abrasive particles also includes drying the abrasive particle precursor mixture to form abrasive particle precursors, removing the plurality of abrasive particle precursors from the mold, and firing the plurality of abrasive particle precursors to form shaped abrasive particles. The method also includes embedding the plurality of fired shaped abrasive particles within a make coat layer on a backing of the abrasive article. The method also includes causing the plurality of shaped abrasive particles to fracture such that the fracture portion provides substantially no abrasive efficacy during the life of the abrasive article.

The method may be implemented such that the particle portion has a polygonal shape. 75% of the abrasive particles have at least about 90% similarity with the polygonal shape after the sacrificial portion fractures off.

The method may be implemented such that it also includes coating the abrasive particles with a magnetically responsive material and orienting the abrasive particles on the backing by providing a magnetic field such that a majority of the abrasive particles are each oriented with a cutting face in the same direction.

The method may be implemented such that the fracture portion is intact during the orienting step. Causing the plurality of abrasive particles to fracture occurs during a first use of the abrasive article.

The method may be implemented such that the plurality of abrasive particles fracture during the drying step.

The method may be implemented such that the fracture portion extends from the particle portion at a corner of a polygonal shape of the particle portion.

The method may be implemented such that the fracture portion extends from am perimeter of a polygonal shape of the article portion.

The method may be implemented such that the fracture portion extends further into a mold than the particle portion.

The method may be implemented such that each of the plurality of mold cavities has a depth.

The method may be implemented such that the depth is variable.

A shaped abrasive particle precursor is presented that includes a first portion comprising a first and second surface. The first and second surfaces are substantially parallel to each other and separated by a thickness. The shaped abrasive particle precursor also includes a second portion, extending from the first portion and a fracture point between the first portion and the second portion. The second portion is configured to break off from the first portion at the fracture point in response to a stress event. The fracture point becomes a cutting point of the shaped abrasive particle.

The shaped abrasive particle precursor may be implemented such that the stress event is a drying step.

The shaped abrasive particle precursor may be implemented such that the stress event is a cooling step.

The shaped abrasive particle precursor may be implemented such that the stress event is a firing step.

The shaped abrasive particle precursor may be implemented such that the stress event is a sintering step.

The shaped abrasive particle precursor may be implemented such that the stress event is an initial contact with a work surface.

The shaped abrasive particle precursor may be implemented such that a force required to cause the second portion to fracture is less than 50% of a fracture force required to fracture the first portion to a half height.

The shaped abrasive particle precursor may be implemented such that it also includes a magnetically responsive coating. The magnetically responsive coating causes the shaped abrasive particle to be responsive to a magnetic field. The shaped abrasive particle, when exposed to the magnetic field, experiences a net torque greater than a torque of the regular portion alone that causes the shaped abrasive particle to orient with respect to the magnetic field such that each of the first and second surfaces are substantially perpendicular to a backing.

The shaped abrasive particle may be implemented such that the second portion extends from the first surface.

The shaped abrasive particle precursor may be implemented such that the second portion extends from the thickness.

The shaped abrasive particle precursor may be implemented such that the first and second surfaces each include a surface profile. The surface profile has an edge and a corner.

The shaped abrasive particle precursor may be implemented such that the second portion extends from the edge.

The shaped abrasive particle precursor may be implemented such that the second portion is colinear with the edge.

The shaped abrasive particle precursor may be implemented such that the second portion is at an angle with respect to the edge.

The shaped abrasive particle precursor may be implemented such that the second portion extends from the corner.

The shaped abrasive particle precursor may be implemented such that the second portion has a surface that is coplanar with the first surface.

The shaped abrasive particle precursor may be implemented such that the second portion has a surface that is at an angle to the first surface.

The shaped abrasive particle precursor may be implemented such that the first portion is substantially a triangle-shape. The second portion extends from a non-hypotenuse edge of the triangle.

The shaped abrasive particle precursor may be implemented such that the second portion has a length of at least 10% of a hypotenuse of the triangle.

The shaped abrasive particle precursor may be implemented such that the second portion length is at least 20% of the hypotenuse.

The shaped abrasive particle precursor may be implemented such that the first portion is a rod shape and the sacrificial portion extends from an end of the rod.

The shaped abrasive particle precursor may be implemented such that the second portion extends from the end of the rod at an angle.

The shaped abrasive particle precursor may be implemented such that the second portion extends from the first surface of the first portion.

The shaped abrasive particle precursor may be implemented such that the second portion and the first portion are formed of a continuous material.

The shaped abrasive particle precursor may be implemented such that the abrasive particle has a cutting face with an edge length and a thickness. An aspect ratio of the edge length to the thickness is at least 2.

The shaped abrasive particle precursor may be implemented such that the aspect ratio of height to the thickness is less than 10.

The shaped abrasive particle precursor may be implemented such that the magnetic field is at least 100 gauss.

The shaped abrasive particle precursor may be implemented such that the magnetic field is at least 1000 gauss.

A method of using an abrasive article includes contacting the abrasive article to a workpiece. The abrasive article includes a backing and a plurality of magnetically responsive particles fixed to the backing. Each of the plurality of magnetically responsive particles are fixed to the backing along a base edge such that the base edge of a plurality of the particles are substantially parallel to each other and such that a cutting face of some of the plurality of magnetic particles are parallel to each other. Each of the particles includes a sacrificial portion. The method also includes moving the abrasive article with respect to the workpiece such that a surface of the workpiece is abraded. Moving the abrasive article causes the sacrificial portion to fracture at a load that is lower than an abrading load.

The method may be implemented such that the load is less than 50% of a force to fracture one of the magnetically responsive particles to half of a particle height. The particle height is a height of a particle measured from the backing.

The method may be implemented such that the fracturing includes the sacrificial portion breaking off of each of the plurality of particles.

The method may be implemented such that the abrasive article has a coating layer.

The sacrificial portion extends at least partially above the coating layer.

The method may be implemented such that the cutting face of each of the plurality of magnetic particles has a cutting edge that contacts the workpiece during abrasion.

The method may be implemented such that the plurality of magnetically responsive particles have a rake angle. The rake angle is between −29° and 90°.

The method may be implemented such that each of the plurality of magnetically responsive particles has a cutting portion and a base portion. The cutting portion has an aspect ratio between 2 and 10. The base portion has an aspect ratio between 1.5 and 10.

The method may be implemented such that the base edge of a portion of the plurality particles are substantially parallel to each other and such that a cutting face of a portion of the plurality of magnetic particles are parallel to each other. The portion is a percentage greater than would have occurred randomly.

The method may be implemented such that the base edge of a majority of the plurality particles are substantially parallel to each other and such that a cutting face of the majority of the plurality of magnetic particles are parallel to each other.

EXAMPLES

Various embodiments of the present disclosure can be better understood by reference to the following Examples which are offered by way of illustration. The present disclosure is not limited to the Examples given herein.

Preparation of Boehmite Sol-Gel

A sample of boehmite sol-gel was made using the following recipe: aluminum oxide monohydrate powder (1600 parts) having the trade designation "DISPERAL" was dispersed by high shear mixing a solution containing water (2400 parts) and 70% aqueous nitric acid (72 parts) for 11 minutes. The resulting sol-gel was aged for 3 hours before coating.

Preparation of Toolings (TOOL)

Figure 16C:
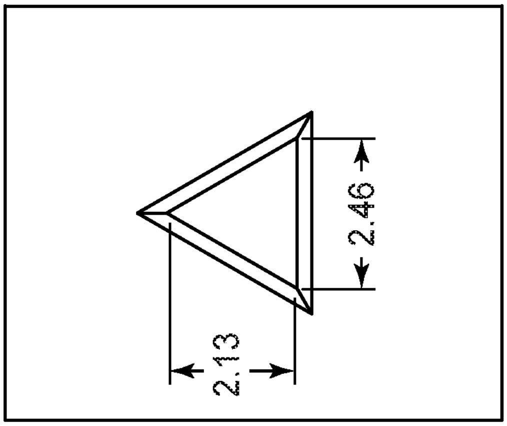
FIGS. 16-17 illustrate mold cavity shapes used to make abrasive particles as discussed in the Examples.
Figure 16B:
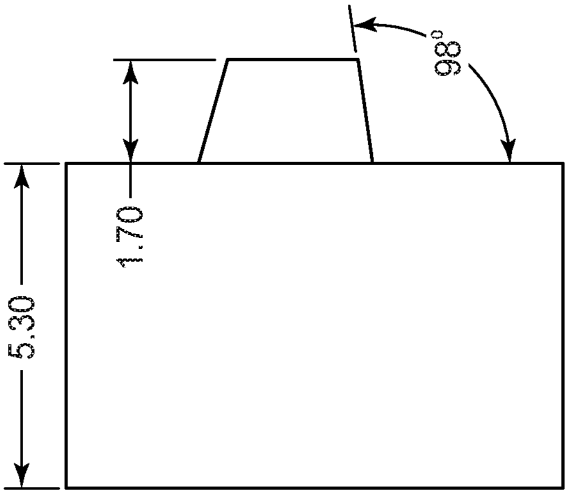
Figure 16A:
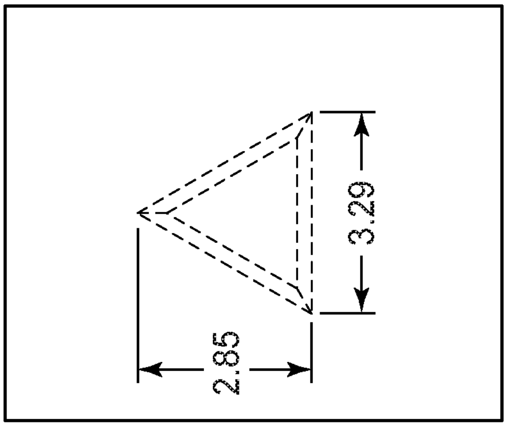

A print file of an embossing plate (EP1) containing equally spaced protrusions with geometry shown in FIGS. 16A-16C was loaded into a stereolithography 3D printer (ProJet 7000HD, 3D Systems, Littleton, CO) machine. The machine printed EP1 using Accura 25 resin (3D Systems, Littleton, CO). EP1 was pressed into a sheet of polypropylene film that was heated to 400*F, creating cavities in the film, forming TOOL 1. TOOL 1 was allowed to cool at room temperature for 60 minutes. A mold release agent, 1% peanut oil in methanol was used to coat the tooling with about 0.5 mg/sqin of peanut oil applied to TOOL1. The excess methanol was removed by placing the sheet of the tooling in an air convection oven for 5 minutes at 45 degrees C.

Figure 17C:
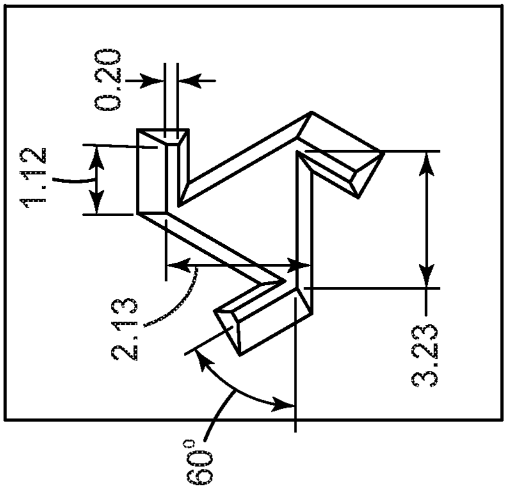
Figure 17B:
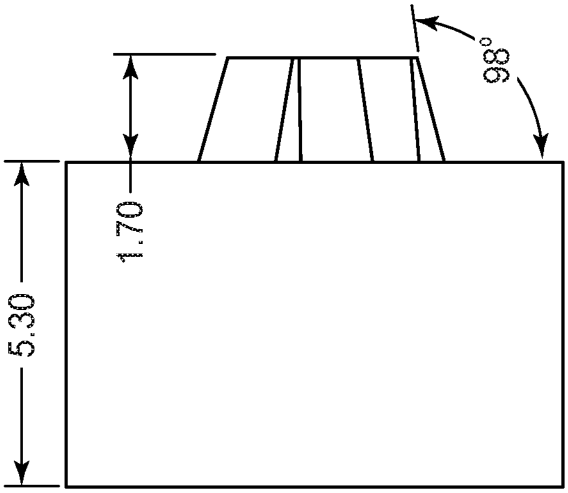
Figure 17A:
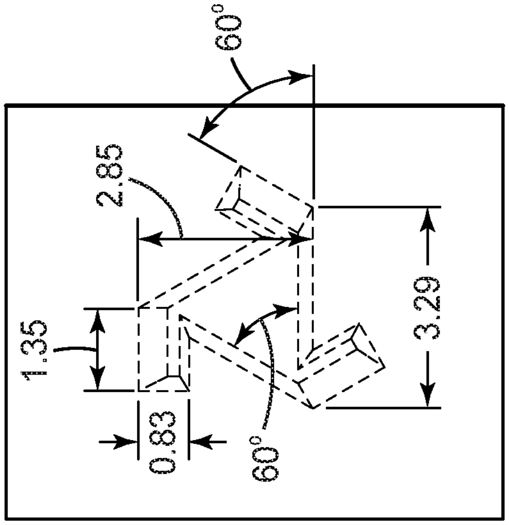

A print file of an embossing plate (EP2) containing equally spaced protrusions with geometry shown in FIG. 17A-17C was loaded into a stereolithography 3D printer (ProJet 7000HD, 3D Systems, Littleton, CO) machine. The machine printed EP2 using Accura 25 resin (3D Systems, Littleton, CO). EP2 was pressed into a sheet of polypropylene film that was heated to 400*F, creating cavities in the film, forming TOOL2. TOOL2 was allowed to cool at room temperature for 60 minutes. A mold release agent, 1% peanut oil in methanol was used to coat the tooling with about 0.5 mg/sqin of peanut oil applied to TOOL2. The excess methanol was removed by placing the sheet of the tooling in an air convection oven for 5 minutes at 45 degrees C.

Comparative Example A

An excess of boehmite sol-gel was forced into the cavities of TOOL1 with a putty knife so that the cavities were completely filled. The filled tooling was allowed to dry at 70 F for 24 hours. The particles were then removed from the tooling and fired in a box kiln at 650*C for 30 minutes and then placed in another box kiln at 1400*C for 30 minutes. A sample of the particles were analyzed with a scanning electron microscope (JSM-7600F from Jeol USA, Peabody, MA). The radius of curvature (ROC) of the tips were determined by fitting a circle with the curvature of the peak. The fitted circle radius measurements were recorded in Table 1.

Example 1

An excess of boehmite sol-gel was forced into the cavities of TOOL2 with a putty knife so that the cavities were completely filled. The filled tooling was allowed to dry at 70 F for 24 hours. The photographic results are shown in FIG. 12A and FIG. 12B. The particles were then removed from the tooling and fired in a box kiln at 650*C for 30 minutes and then placed in another box kiln at 1400*C for 30 minutes. A sample of the resultant fractured tip particles were analyzed with a scanning electron microscope (JSM-7600F from Jeol USA, Peabody, MA). The radius of curvature (ROC) values of the sharpest point of each tip were determined by fitting a circle with the curvature of the peak. The fitted circle radius measurements were recorded in Table 1.

TABLE 1

| Measured ROC values in microns | | |
|---|---|---|
| | Comparative example A | Example 1 |
| | 35.62 | 5.05 |
| | 38.74 | 19.15 |
| | 44.64 | 8.7 |
| | 29.92 | 11.95 |
| | 30.03 | 7.35 |
| | 46.38 | 3.68 |
| | 46.13 | 13.65 |
| | 42.74 | 8.85 |
| | 51.24 | 11.05 |
| | 25.84 | 11.95 |
| | 43.31 | 14.05 |
| | 43.2 | 20.8 |
| | 49.53 | 12.9 |
| | 38.27 | 7.2 |
| | 36.14 | 10.65 |
| | 31.58 | 7.95 |
| | 38.68 | 9.55 |
| | 50.89 | 11.95 |
| | 29.75 | 7.45 |
| | 52.37 | 10.65 |
| | 48.69 | 9.55 |
| Average | 40.7 | 10.7 |

What is claimed is:

1. A method of making an abrasive article, the method comprising:

providing a plurality of shaped abrasive particles, the plurality of abrasive particles formed by:

filling a plurality of mold cavities with an abrasive particle precursor mixture, wherein each of the plurality of mold cavities includes a particle portion and a fracture portion;

drying the abrasive particle precursor mixture to form a plurality of abrasive particle precursors, the particle portion comprising a non-sacrificial portion of the abrasive particle precursor, the fracture portion comprising a sacrificial portion of the abrasive particle precursor, wherein the particle portion and the fracture portion are connected at a fracture point; and removing the plurality of abrasive particle precursors from the mold;

firing the plurality of abrasive particle precursors to form shaped abrasive particles;

embedding the plurality of fired shaped abrasive particles within a make coat layer on a backing of the abrasive article; and causing the plurality of shaped abrasive particles to fracture, wherein fracturing comprises the sacrificial portion at least partially breaking from the non-sacrificial portion under a stress event;

wherein the sacrificial portion provides substantially no abrasive efficacy during the life of the abrasive article; and wherein the fracture portion extends deeper into a mold cavity than the particle portion.

2. The method of claim 1, wherein the particle portion has a polygonal shape, and wherein 75% of the abrasive particles have at least about 90% similarity with the polygonal shape after the sacrificial portion fractures off.

3. The method of claim 1, and further comprising: coating the abrasive particles with a magnetically responsive material; and orienting the abrasive particles on the backing by providing a magnetic field such that a majority of the abrasive particles are each oriented with a cutting face in the same direction.

4. The method of claim 3, wherein the fracture portion is intact during the orienting step, and wherein causing the plurality of abrasive particles to fracture occurs during a first use of the abrasive article.

5. The method of claim 1, wherein the plurality of abrasive particles fracture during the drying step.

6. The method of claim 5, wherein the fracture portion extends from the particle portion at a corner of a polygonal shape of the particle portion.

7. The method of claim 5, wherein the fracture portion extends from a perimeter of a polygonal shape of the particle portion.

8. The method of claim 1, wherein each of the plurality of mold cavities has a depth.

9. The method of claim 8, wherein the depth is variable.

* * * * *